(12) United States Patent
Jungnickel et al.

(10) Patent No.: US 10,103,921 B2
(45) Date of Patent: *Oct. 16, 2018

(54) METHOD AND APPARATUS FOR TRANSMITTING A SIGNAL

(71) Applicant: Fraunhofer-Gesellschaft zur Foerderung der angewandten Forschung e.V., Munich (DE)

(72) Inventors: Volker Jungnickel, Berlin (DE); Liane Grobe, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,597

(22) Filed: Oct. 5, 2017

(65) Prior Publication Data

US 2018/0034676 A1    Feb. 1, 2018

Related U.S. Application Data

(63) Continuation of application No. 15/057,025, filed on Feb. 29, 2016, now Pat. No. 9,813,276, which is a
(Continued)

(51) Int. Cl.
*H04B 15/00* (2006.01)
*H04L 27/26* (2006.01)
(Continued)

(52) U.S. Cl.
CPC .... *H04L 27/2643* (2013.01); *H04L 25/03828* (2013.01); *H04L 27/2621* (2013.01);
(Continued)

(58) Field of Classification Search
CPC ....... H04B 3/32; H04B 3/23; H04L 25/03343; H04L 25/497; H04L 25/03057;
(Continued)

(56) References Cited

U.S. PATENT DOCUMENTS 6,621,340 B1 * 9/2003 Perthold ............... H03F 1/3241
330/129
6,630,862 B1 * 10/2003 Perthold ............... H03F 1/3241
330/136
(Continued)

FOREIGN PATENT DOCUMENTS

CN    101595672 A    12/2009
CN    101682592 A     3/2010
(Continued)

OTHER PUBLICATIONS

3GPP, "Evolved Universal Terrestrial Radio Access (E-UTRA); Physical Channels and Modulation (Release 8)", 3GPP TS 36.211 v8.8.0, Physical Channels and Modulation, Tech. Rep, Dec. 2009, 85 pages.
(Continued)

*Primary Examiner* — James M Perez
(74) *Attorney, Agent, or Firm* — Perkins Coie LLP; Michael A. Glenn

(57) ABSTRACT

A method for transmitting a signal is described, wherein the method has transforming a signal into a frequency domain to obtain a spectrum, forming a filtered spectrum according to a filter spectrum and occupying a set of subcarriers of a frequency domain representation of an Orthogonal Frequency Division Multiplex (OFDM) signal with the filtered spectrum. A temporary signal is obtained by transforming the frequency domain representation of the OFDM signal into a time domain. The temporary signal is subjected to a phase modulation.

15 Claims, 10 Drawing Sheets

US 10,103,921 B2
Page 2

Related U.S. Application Data continuation of application No. PCT/EP2013/068019, filed on Aug. 30, 2013.

(51) Int. Cl.
*H04L 25/03* (2006.01)
*H04W 72/04* (2009.01)

(52) U.S. Cl.
CPC ...... *H04L 27/2636* (2013.01); *H04L 27/2644* (2013.01); *H04L 27/2649* (2013.01); *H04W 72/0453* (2013.01)

(58) Field of Classification Search
CPC .............. H04L 25/4917; H04L 25/4925; H04L 25/4919; H04L 25/0272; H04L 29/4923
USPC .................. 375/259–285, 295–352
See application file for complete search history.

(56) References Cited

U.S. PATENT DOCUMENTS

| | | | | |
|---|---|---|---|---|
| 7,061,997 B1* | 6/2006 | Eberlein | H04L 27/266 | 370/210 |
| 7,173,979 B1* | 2/2007 | Badri | H04L 27/2608 | 375/260 |
| 7,295,626 B2* | 11/2007 | Chayat | H04L 5/023 | 375/260 |
| 8,059,748 B2* | 11/2011 | See | H03C 5/00 | 375/296 |
| 8,144,814 B2* | 3/2012 | Menon | H04L 25/067 | 375/322 |
| 8,295,418 B2* | 10/2012 | Geng | H04B 1/1036 | 375/350 |
| 8,422,572 B2 | 4/2013 | Forck et al. | | |
| 8,565,336 B2* | 10/2013 | Lim | H04L 27/183 | 375/260 |
| 8,599,945 B2* | 12/2013 | Sampath | H04B 7/0417 | 375/260 |
| 8,737,499 B2* | 5/2014 | Sikri | H04L 25/03012 | 370/208 |
| 8,787,142 B2* | 7/2014 | Cyranka | H04J 11/004 | 370/203 |
| 8,848,651 B2 | 9/2014 | Gaebler et al. | | |
| 8,891,662 B2* | 11/2014 | Jeong | H04L 5/0051 | 375/232 |
| 8,942,314 B2* | 1/2015 | Aparin | H04B 1/0475 | 375/267 |
| 8,989,299 B2* | 3/2015 | Zhou | H04B 7/0639 | 375/285 |
| 9,191,080 B2* | 11/2015 | Yokomakura | H04L 1/0071 | |
| 9,197,282 B2* | 11/2015 | Cahn | H04B 1/707 | |
| 9,294,329 B2* | 3/2016 | Kohda | H04L 27/368 | |
| 9,300,510 B2* | 3/2016 | You | H04L 1/0071 | |
| 9,319,166 B2* | 4/2016 | Khoryaev | H04L 1/0057 | |
| 9,425,880 B2* | 8/2016 | Kim | H04L 27/261 | |
| 9,479,381 B2* | 10/2016 | Siohan | H04L 1/0668 | |
| 9,813,276 B2* | 11/2017 | Jungnickel | H04L 25/03828 | |
| 9,853,849 B1* | 12/2017 | Geile | H04L 27/2636 | |
| 2003/0169824 A1* | 9/2003 | Chayat | H04L 5/023 | 375/260 |
| 2006/0109445 A1* | 5/2006 | Walf | G03F 7/70291 | 355/67 |
| 2006/0209978 A1* | 9/2006 | Jungnickel | H04B 7/0413 | 375/267 |
| 2006/0232447 A1* | 10/2006 | Walker | H04L 27/3488 | 341/50 |
| 2007/0274417 A1* | 11/2007 | Menon | H04L 1/206 | 375/332 |
| 2007/0280365 A1* | 12/2007 | Seki | H04L 5/0046 | 375/260 |
| 2008/0144707 A1* | 6/2008 | Tsfati | H04B 17/13 | 375/224 |
| 2008/0212688 A1* | 9/2008 | Aue | H04W 52/0216 | 375/240.26 |
| 2008/0226001 A1* | 9/2008 | Geng | H04B 1/1036 | 375/350 |
| 2009/0074106 A1* | 3/2009 | See | H03C 5/00 | 375/297 |
| 2009/0147669 A1* | 6/2009 | Green | H04L 5/0007 | 370/215 |
| 2009/0161749 A1* | 6/2009 | Nangia | H04L 5/0007 | 375/233 |
| 2009/0268735 A1* | 10/2009 | Gu | H04L 1/0016 | 370/392 |
| 2010/0098182 A1* | 4/2010 | Forck | H04L 27/2636 | 375/261 |
| 2010/0099422 A1* | 4/2010 | Gaebler | H04L 5/0007 | 455/450 |
| 2010/0165829 A1* | 7/2010 | Narasimha | H04L 27/2614 | 370/210 |
| 2010/0177852 A1* | 7/2010 | Li | H04L 27/2662 | 375/340 |
| 2010/0246711 A1* | 9/2010 | Kishigami | H04L 5/0039 | 375/295 |
| 2011/0051830 A1* | 3/2011 | Tsao | H04L 27/2657 | 375/261 |
| 2011/0064041 A1* | 3/2011 | Hooli | H04L 5/0007 | 370/329 |
| 2011/0116581 A1* | 5/2011 | Yamada | H04B 7/0413 | 375/341 |
| 2011/0129025 A1* | 6/2011 | Jaeckel | H03M 13/356 | 375/260 |
| 2011/0182332 A1* | 7/2011 | Ericson | H04L 5/0044 | 375/219 |
| 2011/0305286 A1* | 12/2011 | Shimezawa | H04L 27/2607 | 375/260 |
| 2012/0113897 A1* | 5/2012 | Thiele | H04B 7/024 | 370/328 |
| 2013/0094617 A1* | 4/2013 | Shirosugi | H04N 21/4882 | 375/340 |
| 2013/0315051 A1* | 11/2013 | Malladi | H04B 7/0417 | 370/210 |
| 2013/0336425 A1* | 12/2013 | Lee | H04L 27/12 | 375/303 |
| 2014/0269991 A1* | 9/2014 | Aparin | H04B 1/0475 | 375/297 |
| 2014/0362898 A1* | 12/2014 | Anand | H04L 25/03949 | 375/229 |
| 2015/0124902 A1* | 5/2015 | Goto | H04L 27/2604 | 375/295 |
| 2015/0139120 A1* | 5/2015 | ElArabawy | H04L 5/0057 | 370/329 |
| 2015/0139293 A1* | 5/2015 | Stanwood | H04L 27/01 | 375/230 |
| 2015/0156037 A1* | 6/2015 | Sahlin | H04L 25/022 | 375/349 |
| 2015/0280945 A1* | 10/2015 | Tan | H04L 27/2615 | 375/267 |
| 2016/0182270 A1* | 6/2016 | Jungnickel | H04L 25/03828 | 375/260 |
| 2018/0034676 A1* | 2/2018 | Jungnickel | H04L 25/03828 | |
| 2018/0054332 A1* | 2/2018 | Kuchi | H04L 25/03834 | |

FOREIGN PATENT DOCUMENTS

| | | |
|---|---|---|
| CN | 102273158 A | 12/2011 |
| JP | 2007329588 A | 12/2007 |
| JP | 2009055395 A | 3/2009 |
| JP | 2009516416 A | 4/2009 |
| JP | 2011512093 A | 4/2011 |
| JP | 2012514420 A | 6/2012 |
| KR | 20010058851 A | 7/2001 |
| KR | 100810900 B1 | 2/2008 |
| WO | 2012/049912 A1 | 4/2012 |

OTHER PUBLICATIONS

Brueninghaus, et al., "Multi-Carrier Spread Spectrum and its Relationship to Single-Carrier Transmission", in Proc. IEEE Vehicular

(56) References Cited

OTHER PUBLICATIONS

Technology Conf., VTC'98, vol. 3, May 1998, pp. 2329-2332.
EN 301 545-2 V I. 1.1, "Digital Video Broadcasting (DVB); Second Generation DVB Interactive Satellite System (DVB-RCS2); Part 2:Lower Layers for Satellite Standard", ETSI Std, Jan. 2012, 195 pages.
Gentile, Ken, "The Care and Feeding of Digital, Pulse-Shaping Filters", RF Mixed Signal, www.rfdesign.com, Apr. 2002, 6 pages.
Jungnickel, et al., "Localized SC-FDMA with Constant Envelope", In Proc. IEEE Int. Symp. On Personal, Indoor and Mobile Radio Comm. (PIMRC), London, UK, Sep. 8-11, 2013, 9 pages.
Jungnickel, V. et al., "SC-FDMA Waveform Design, Performance, Power Dynamics and Evolution to MIMO", in Proc. IEEE International Conference on Portable Information Devices (Portable), May 2007, 6 pages.
Kawamura, T. et al., "Investigations on Optimum Roll-off Factor for DFT-Spread OFDM Based SCFDMA Radio Access in Evolved UTRA Uplink", In Proc. Int. Symp. Wireless Comm. Systems (ISWCS), Sep. 6-8, 2006, pp. 383-387.
Kramer, G. et al., "Ethernet Passive Optical Network (EPON): Building a Next-Generation Optical Access Network", IEEE Communications Magazine, vol. 40, No. 2, Feb. 2002, pp. 66-73.
Lien, S Y., "Toward Ubiquitous Massive Accesses in 3GPP Machine-to-Machine Communications", IEEE Communications Magazine, vol. 49, No. 4, Apr. 2011, pp. 66-74.
Murota, K. et al., "GMSK Modulation for Digital Mobile Radio Telephony", IEEE Transactions on Communications, vol. 29, No. 7, Jul. 1981, pp. 1044-1050.
Myung, H. G. et al., "Single Carrier FDMA for Uplink Wireless Transmission", IEEE Vehicular Technology Magazine, vol. 1, No. 3, Sep. 2006, pp. 30-38.
Myung, Hyung G. et al., "Peak-To-Average Power Ratio of Single Carrier FDMA Signals with Pulse Shaping", Proceedings IEEE International Symposium on Personal Indoor and Mobile Radio Communications, PIMRC, Sep. 2006, 5 pages.
NTTDOCOMO, NEC, and Sharp, "R1-050702: DFT-Spread OFDM with Pulse Shaping Filter in Frequency Domain in Evolved UTRA Uplink", 3GPP TSG RAN WG1 42, London, UK, Aug. 29-Sep. 2, 2005, 8 pages.
Sawai, R. et al., "Simulation Program to Realize GMSK Transmission System", [Online]. Available: http://www.codeforge.com/read/142158/gmsk.m, Aug. 25, 2010, 2 pages.
Turletti, T., "GMSK in a Nutshell", http://citeseerx.ist.psu.edu/viewdoc/summary?doi=10.1.1.39.9127., Apr. 1996, 6 pages.
Wu, et al., "Power De-rating Reduction for DFT-S-OFDM System", in Proc. IET International Conference on Wireless, Mobile and Multimedia Networks, Nov. 6-9, 2006, 4 pages.
Wylie-Green, Marilyn P. et al., "Introduction to CPM-SC-FDMA: A Novel Multiple-Access Power-Efficient Transmission Scheme", IEEE Transactions on Communications, IEEE Service Center, Piscataway, NJ, USA, vol. 59, No. 7, Jul. 7, 2011, pp. 1904-1915.

\* cited by examiner

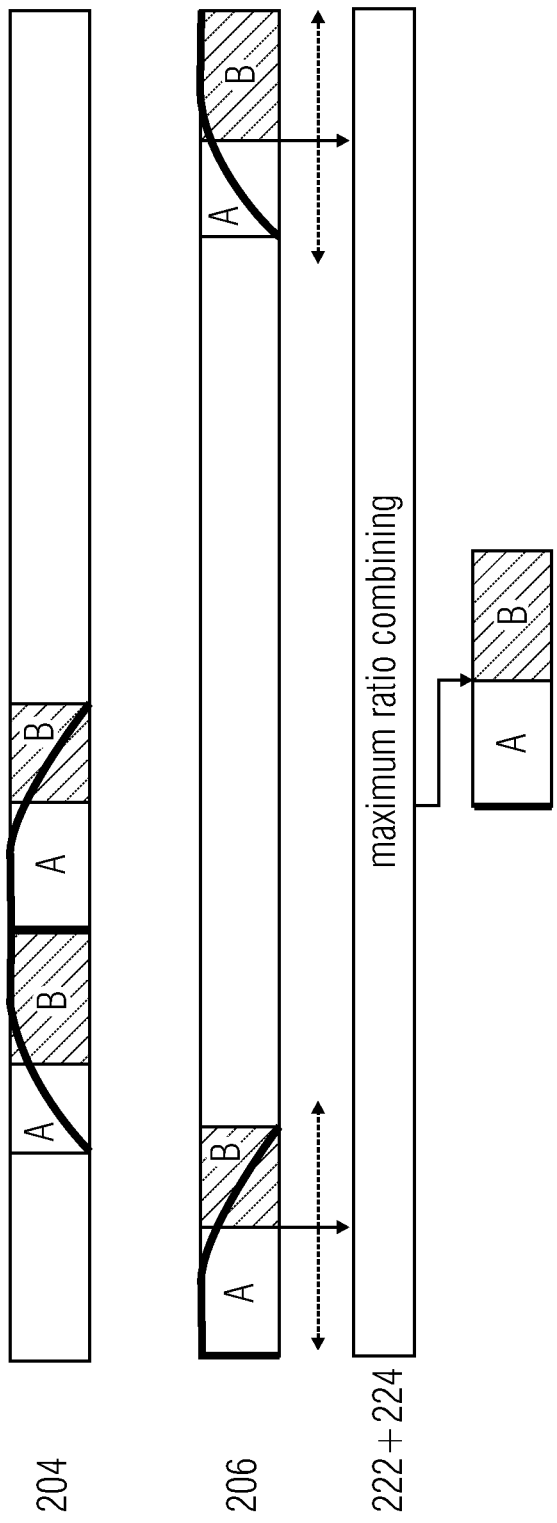

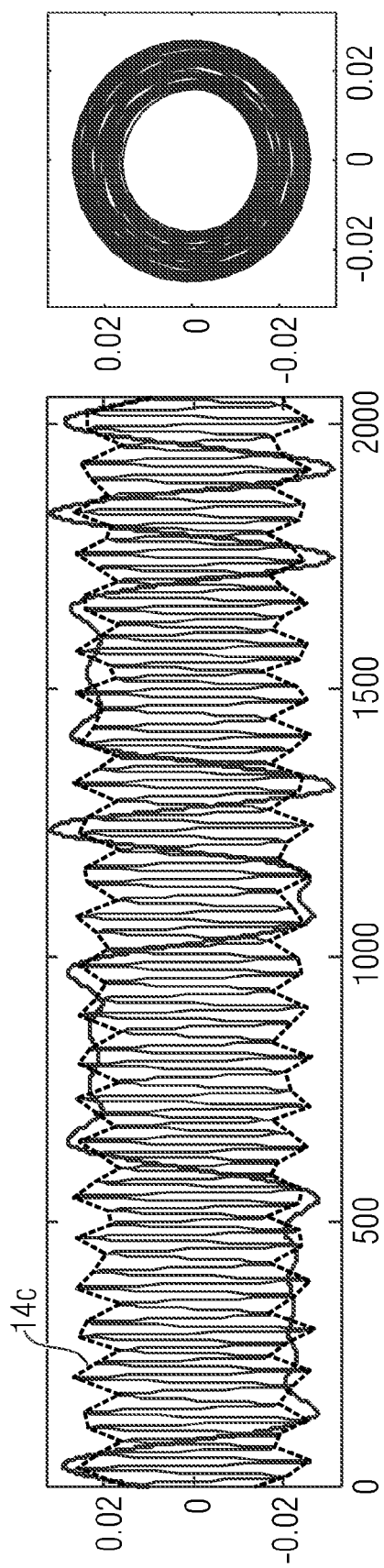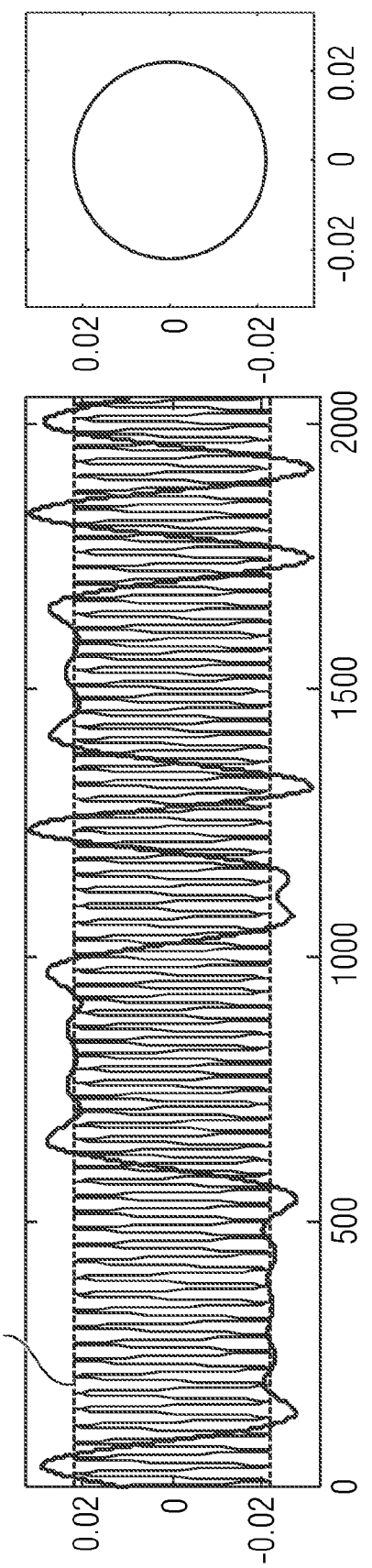
FIG 5C
FIG 5D

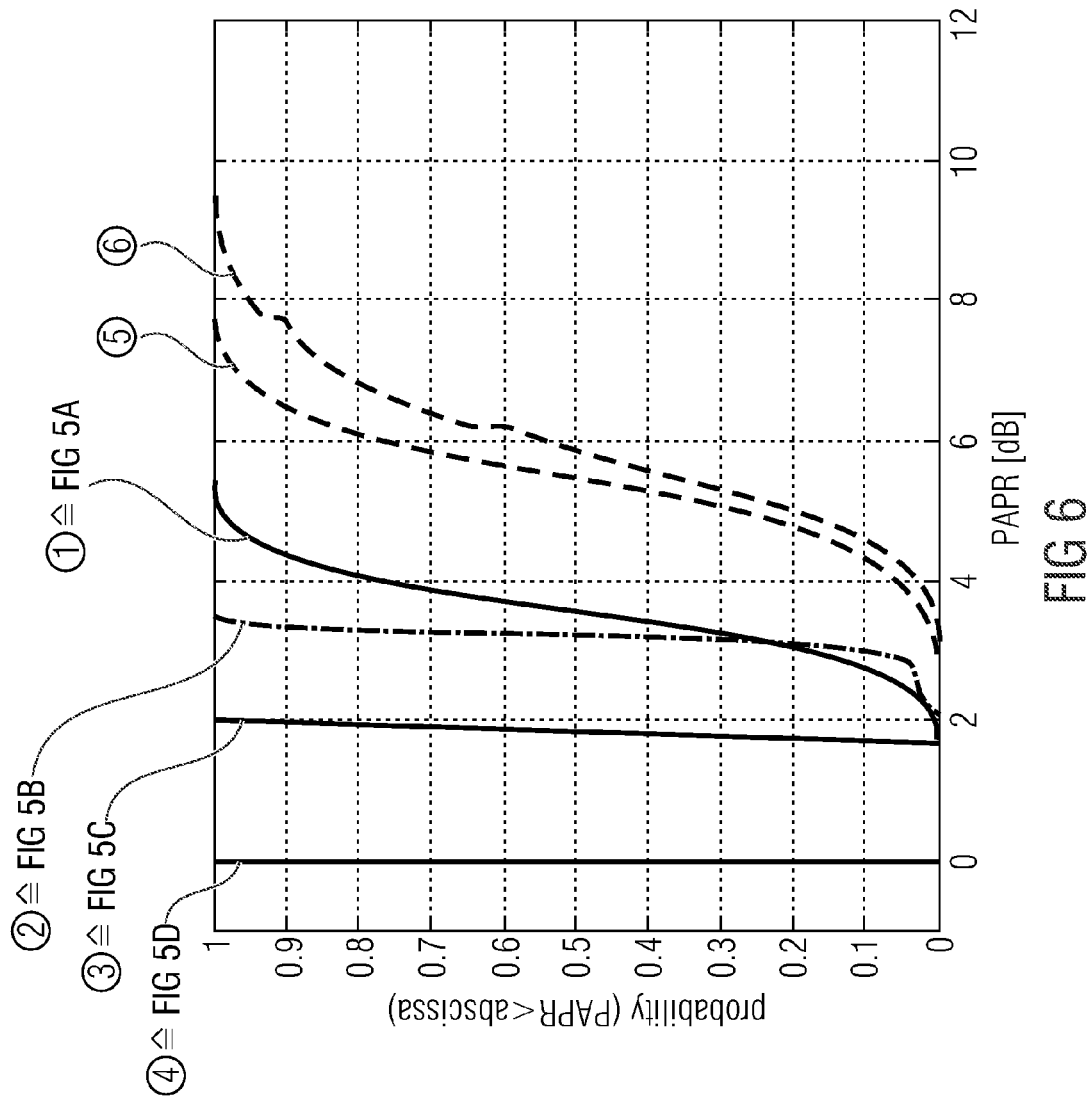

| Modulation | 50% / 99% of cumulative PAPR statistics [dB] | | |
|---|---|---|---|
| | OFDMA | SC-FDMA, like LTE | SC-FDMA, filtered 100 |
| GMSK | - | - | 0 / 0 |
| $\frac{\pi}{2}$-BPSK | 6.3 / 9.2 | 3.6 / 5.3 | 1.8 / 1.9 |
| BPSK | 5.9 / 9.5 | 5.8 / 7.9 | 3.2 / 3.5 |
| $\frac{\pi}{4}$-QPSK | 6.5 / 9.3 | 4.6 / 6.2 | 2.8 / 2.9 |
| QPSK | 6.5 / 9.4 | 4.6 / 6.7 | 3.0 / 3.3 |
| 16-QAM | 6.4 / 9.2 | 4.9 / 7.1 | 4.7 / 6.2 |
| 64-QAM | 6.5 / 9.3 | 5.3 / 7.6 | 5.3 / 6.4 |

FIG 7

METHOD AND APPARATUS FOR TRANSMITTING A SIGNAL

CROSS-REFERENCE TO RELATED APPLICATION

This application is a continuation of copending U.S. patent application Ser. No. 15/057,025, filed Feb. 29, 2016, which is a continuation of International Application No. PCT/EP2013/068019, filed Aug. 30, 2013, which are each incorporated herein in its entirety by this reference thereto.

BACKGROUND OF THE INVENTION

Embodiments of the present invention relate to a method for transmitting a signal. Further embodiments relate to a method for receiving a signal. Further embodiments of the present invention relate to an apparatus for transmitting a signal. Further embodiments of the present invention relate to an apparatus for receiving a signal.

In the field of multiple access algorithms via so-called shared-media channels the so-called Single-Carrier Frequency-Division Multiple Access (SC-FDMA) has gained acceptance in mobile communications in the Long Term Evolution (LTE) for the uplink from the terminals to the base station. This method provides a number of advantages, including: a high spectral efficiency, a highly flexible assigning of resources according to a channel quality and network utilization, simple means for equalization in the frequency domain and low power fluctuations compared to Orthogonal Frequency-Division Multiple Access (OFDMA), so that the single-carrier frequency-division multiple access (SC-FDMA) scheme is already used in the Long Term Evolution (LTE) mobile radio standard [4].

The last point, the low power fluctuation, was not identified as a core problem in LTE Release 8-10. However, meanwhile this topic is focused on increasingly, because a strong increase of the number of users of so-called Machine-To-Machine Communication (M2M) is expected. This is taken to mean a connection of innumerable distributed sensors via mobile communication to the internet. This raises the question, how to integrate mostly low level services for sensor nodes as efficiently as possible into mobile communications with the lowest energy or power consumption possible.

Presently, the relatively high overhead of the protocol is initially focused, which is necessitated for a random access such as a dial-up of a sensor node to the mobile network. However, a majority of the sensors will be immobile. For regular operations, fixed, i.e., constant or time invariant, channel resources may be assigned and primarily the transmit power has to be utilized efficiently to achieve long battery operation times.

For quite some time an approach is examined, to extend the SC-FDMA method by an additional root-raised-cosine filtering, whereby a higher bandwidth is used for transmitting a signal. The filtering leads to a smoothing of the envelope as it is described by a method 100 in FIG. 1. The output signal of the Discrete Fourier Transformation (DFT) is repeated several times in the frequency domain to emulate an oversampling in the time domain. Then, the signal is going to be filtered in the frequency domain, the filter having a root-raised-cosine profile. The equalization that can be achieved depends on the so-called $\alpha$-factor of a filter profile. The larger it is, the more bandwidth is necessitated and the smoother or plainer is the envelope of the waveform. A smooth or plain envelope means low fluctuations of an amplitude of the envelope of a waveform, as it will be described in FIGS. 5a-5d. While in [7, 16, 17] $\alpha$-values below 0.25 were examined, values of about $\alpha$=0.7 effectuate a significantly smoother envelope, as it is described in [11, 19]. To achieve this, also a higher bandwidth is necessitated.

A patent [9] as well as several session publications, which are summarized in a journal article [10] cover the CPM-IFDMA proposal. These publications cover combinations of the CPM with the distributed form of SC-FDMA. Continuative problem solving approaches are based on the so-called continuous phase modulation (CPM) as it is described exemplarily in [9, 10]. The solution proposed up to now is based on a second, distributed variant of SC-FDMA, which is also denoted as Interleaved Frequency Division Multiple Access (IFDMA). During this transmission, a comb is formed in the frequency domain out of fractions of the altogether available OFDM-subcarriers with a constant gap between the used subcarriers. IFDMA has not gained acceptance in LTE for several reasons, in particular the high pilot overhead necessitated for channel estimation. In addition, the CPM-IFDMA approach seems to be not completely optimized with respect to the remaining power fluctuations. The remaining fluctuations, described in [10] are supposedly to be traced back to the generation of the CPM-sequence before performing the N-DFT. In [9, 10], the MSK modulation is generated in the time domain, sub-sampled and afterwards routed in the N-DFT.

Hence, there is a need for an optimization of transmit power efficiency, which allows for an implementation to or an integration into the actually used localized SC-FDMA transmission mode in LTE. An increased transmit power efficiency may extend battery lifetime of a sensor unit communicating via a wireless or wired network.

SUMMARY

According to an embodiment, a method for transmitting a signal may have the steps of: transforming a signal into a frequency domain to obtain a spectrum; forming a filtered spectrum according to a filter spectrum; transforming a frequency domain representation of an Orthogonal Frequency Division Multiplex (OFDM) signal, the frequency domain partially occupied with the filtered spectrum into a time domain to obtain a temporary signal; and subjecting the temporary signal to a phase modulation.

According to another embodiment, a method for receiving a signal may have the steps of: transforming an OFDM signal, the frequency representation thereof partially occupied with a filtered spectrum to a time domain to obtain a phase-modulated temporary signal; subjecting the phase-modulated temporary signal to a phase de-modulation to obtain a temporary signal; transforming the temporary signal into a frequency domain to obtain a spectrum; and forming the spectrum according to a matched filter spectrum.

Another embodiment may have an apparatus for transmitting a signal, the apparatus configured to transform a signal into a frequency domain such that a spectrum is obtained; form a filtered spectrum according to a filter spectrum; transform an Orthogonal Frequency Division Multiplex (OFDM) spectrum partially occupied with the filtered spectrum into a time domain such that a temporary signal is obtained; and subject the temporary signal to a phase modulation.

Still another embodiment may have an apparatus for receiving a signal, the apparatus configured to transform an OFDM signal, the frequency representation thereof partially occupied with a filtered spectrum to a time domain such that a phase-modulated temporary signal is obtained; subject the phase-modulated temporary signal to a phase de-modulation such that a temporary signal is obtained; transform the temporary signal into a frequency domain such that a spectrum is obtained; and form the spectrum according to a matched filter spectrum.

Another embodiment may have a non-transitory storage medium having stored thereon a computer program having a program code for performing, when running on a computer, the above methods.

Embodiments of the present invention relate to a method for transmitting a signal. The method comprises a transforming of a signal into a frequency domain to obtain a spectrum and a forming of a filtered spectrum according to a filter spectrum. The method further comprises a partial occupying of a set of subcarriers of an Orthogonal Frequency Division Multiplex (OFDM) signal with the filtered spectrum and a transforming of the frequency domain representation of the OFDM signal into a time domain to obtain a temporary signal, i.e., a signal which is transformed temporarily to the time domain. The temporary signal is subjected to a phase modulation.

It has been found by the inventors that by subjecting the temporary signal to a phase modulation while operating in the time domain, a peak-to-average power ratio (PAPR) can be reduced down to around 0 dB allowing a more efficient operation of transmitters compared to LTE transmitters comprising a PAPR of around 5 dB.

Further embodiments relate to a method for receiving a signal. The method comprises a transforming of a frequency domain representation of an OFDM signal partially occupied with a filtered spectrum to a time domain to obtain a phase-modulated temporary signal. The phase-modulated temporary signal is subjected to a phase demodulation to obtain a temporary signal. The temporary signal is transformed into a frequency domain to obtain a spectrum, i.e., a frequency domain representation of the signal. The spectrum is formed according to an inverse filter spectrum.

By demodulating the received signal according to the method for receiving a signal, changes or modifications of the signal and/or the spectrum generated by a method for transmitting the received signal may be reversed, such that the received signal may be decoded and/or processed and to recover the original signal sent by a transmitter.

Further embodiments relate to an apparatus for transmitting a signal. The apparatus is configured to transform a signal into a frequency domain, such that a spectrum is obtained. The apparatus is further configured to form a filtered spectrum according to a filter spectrum and to partially occupy a set of subcarriers of a frequency domain representation of an OFDM signal with the filtered spectrum. The apparatus is further configured to transform the frequency domain representation of the OFDM signal into a time domain, such that a temporary signal is obtained and to subject the obtained temporary signal to a phase modulation.

It has been found by the inventors that an apparatus for transmitting a signal, which is configured according to the previous descriptions may utilize a predefined maximum transmit power more efficiently, such that by maintain current or present transmit ranges less transmit power may be necessitated or by maintaining the current or present transmit power, a higher transmit range may be achieved, wherein both aspects may also be combined.

Further embodiments relate to an apparatus for receiving a signal. The apparatus is configured to transform an OFDM signal partially occupied with a filtered spectrum to a time domain, such that a phase-modulated temporary signal is obtained. The apparatus is further configured to subject the phase-modulated temporary signal to a phase demodulation, such that a temporary signal is obtained and to transform the temporary signal into a frequency domain, such that a spectrum is obtained. The apparatus is further configured to form the spectrum according to an inverse filter spectrum.

Further embodiments of the present invention relate to a non-transitory storage medium having stored thereon a computer program having a program code for performing transmission or reception of a signal.

BRIEF DESCRIPTION OF THE DRAWINGS

Embodiments of the present invention will be described in more detail using the accompanying figures in which:

FIG. 4 shows a detailed view of the maximum ratio combining used in the method for receiving the signal as an inverse operation of FIG. 3;

FIG. 5c shows a real value of a complex valued waveform having an envelope and a corresponding trace of a signal modulated using RRC-filtered SC-FDMA using $\pi/2$-BPSK modulation;

FIG. 5d shows a real value of a complex valued waveform having an envelope and corresponding traces of a GMSK-modulated localized SC-FDMA waveform using bandwidth-time product of 0.3 like in 2G mobile networks;

FIG. 6 shows a comparison of the peak-to-average power ratio (PAPR) statistics for several waveforms;

FIG. 7 shows a table with exemplary quantities of peak-to-average power ratio of SC-FDMA.

DETAILED DESCRIPTION OF THE INVENTION

Figure 1:
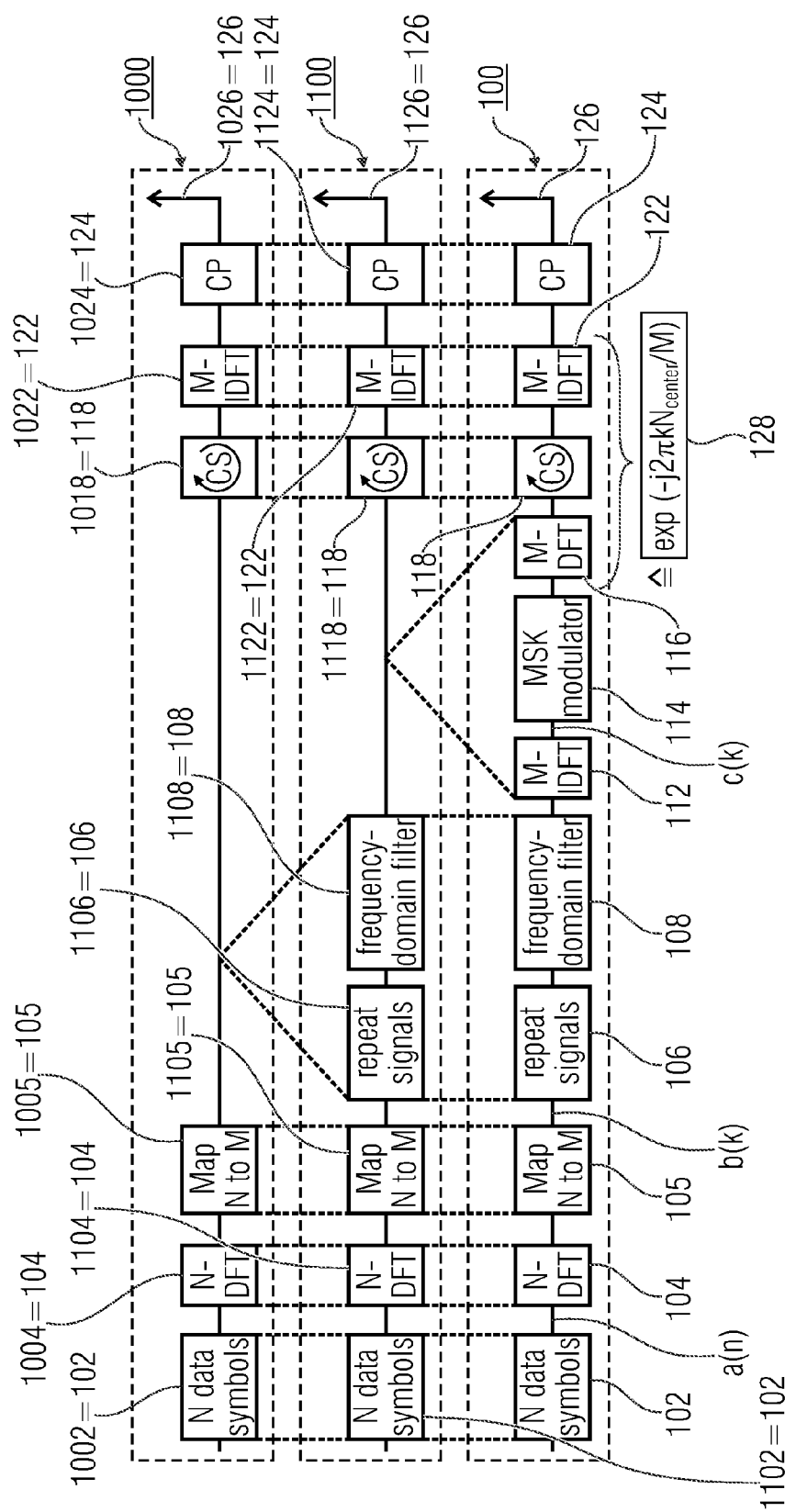
FIG. 1 shows a schematic block diagram of advanced methods for transmitting a SC-FDMA signal.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of an advanced method 100 for transmitting a SC-FDMA signal. FIG. 1 also depicts a flowchart of a method 1000 which conforms to a method performed in LTE Standard Release 8 and a method 1100 which emulates an upsampling of the signal to be transmitted for obtaining a reduced peak-to-average power ratio (PAPR) by modifying method 1000.

In the following, first method 100 is described. Afterwards, methods 1000 and 1100 are described and compared to the inventive method.

In a first step 102 of method 100, a data symbol sequence a(n) with n=1, 2, . . . , N, comprising a length of N data symbols is represented by a number of N sampling points of a waveform or signal. In a step 104, the data symbol sequence a(n) is passed through a Digital Fourier Transformation comprising N sampling points. The result of the N-DFT is a spectrum, i.e., frequency domain representation, of the data symbol sequence a(n) comprising a number of N symbols.

In a step 105, the spectrum with N symbols occupying a number of N subcarriers are mapped to a number of M subcarriers with M>N, wherein M denotes a number of symbols of the transmitted signal in the medium to accessed for transmission. The mapping may be performed such that the obtained spectrum is a frequency domain representation of an OFDM signal which is partially occupied with the spectrum obtained by the N-DFT of step 104.

In a step 106, the obtained spectrum occupying the number, i.e., set, of N subcarriers out of the number of M available subcarriers is repeated for a number of F times in the frequency domain to obtain a repeated spectrum b(k), wherein F denotes an upsampling factor. A repetition (or copying) of the spectrum in the frequency domain (e.g., to a frequency range that is different from the frequency range to be repeated or copied) yields in a repeated spectrum which would be obtained when the data symbol sequence would have been oversampled in the time domain. Thus, step 106 emulates an upsampling of the data symbol sequence a(n), wherein the upsampling is realized in the frequency domain instead of sampling in the time domain. The upsampling by a factor F may be determined by the determination rule $$F = \left\lfloor \frac{M}{N} - 0.5 \right\rfloor.$$

The upsampling yields in the repeated spectrum b(k). b(k) can also be described as $$b(k) = \begin{cases} a(n) & \text{if } k = F \cdot n \\ 0 & \text{else} \end{cases}$$

wherein k=1, 2, . . . , F·N and wherein M is a number of samples in the final waveform. F may thus be formed by dividing M by N, subtracting 0.5 and rounding the result to the nearest integer less than or equal the result of the difference.

F-times upsampling followed by M-DFT is equivalent to applying N-DFT and subsequent spectral repetition provided that M/N is an integer, as it is presented in [11]. This can be proven by using the formula above and performing M-DFT of an upsampled sequence according to the determination rule:

$$B_l = \sum_{k=1}^{M-1} b(k) e^{j2\pi \frac{lk}{M}} = \sum_{n=1}^{N-1} a(n) e^{j2\pi \frac{ln}{N}}.$$

This may equal the N-DFT of the data symbol sequence a(n), which may be denoted as the original sequence. It may be regarded as straightforward that $B_l = B_{l+f \cdot N}$, i.e. the resulting spectrum is periodic in the frequency domain at each $N^{th}$ subcarrier. Accordingly, an upsampling in the time domain and M-DFT may be replaced by N-DFT and repeating the output signal, respectively the output spectrum, in the frequency domain as it is implemented by the steps 104 and 106. Thus, in the step 106, upsampling is emulated by repeating the output signal in the frequency domain. Details on the emulation of the upsampling are described in [12].

In a step 108 the repeated spectrum is formed to a filtered spectrum according to a filter spectrum which may be defined, for example, by a bell-shape. The filter spectrum can be, for example, a Gaussian filter. In other words, a filter, e.g. a Gaussian filter, is applied to the repeated spectrum in the frequency domain. The repeated spectrum may be an Orthogonal Frequency Division Multiplex (OFDM) spectrum, i.e., a frequency domain representation of the OFDM signal, with the number of N subcarriers that are mapped to the number of M subcarriers of the SC-FDMA signal. The frequency domain representation of the OFDM signal can be obtained, for example, by multiplexing one or more spectra in the frequency domain such that the multiplexed spectra are orthogonal to each other. The repeated spectrum occupies a set of at least one (F=n=1) subcarrier out of the number of subcarriers.

The frequency domain filter which may be utilized in step 108 can be implemented so flexibly that bandwidth of the filter can be changed as a function of the block size N. A vector with a running index s=[−N, . . . , N] may be defined to compute the bell-shape part of the filter according to the determination rule:

$$G_l = \sqrt{0.5\left(1 + \cos\left[\frac{\pi\left(|s_l| - (1-\alpha) \cdot \frac{N}{2}\right)}{\alpha \cdot N}\right]\right)}$$

with l=1, 2, . . . , 2N+1. Such a filter is transparent in a range a, which can be defined as:

$$a = \left[N + 1 - \left\lfloor \frac{(1-\alpha)N}{2} \right\rfloor \ldots N + 1 + \left\lfloor \frac{(1-\alpha)N}{2} \right\rfloor\right]$$

Two regions, i.e. frequency ranges with higher or lower frequencies than range a, where the filter may attenuate totally may be defined according to:

$$b = \left[1 \ldots (N+1) - \left\lfloor \frac{(1+\alpha)N}{2} \right\rfloor\right]$$

$$c = \left[(N+1) + \left\lfloor \frac{(1+\alpha)N}{2} \right\rfloor \ldots 2N+1\right]$$

A kind of rectangular filter or window might be implemented by correcting $G_l$ as $G_a=1$ in range a and $G_b$ and $G_c$ for the ranges b and c=0.

In a step 112, an Inverse Digital Fourier Transformation comprising M symbols (M-IDFT) is used to obtain a filtered data sequence c(k). In a step 114, c(k) subjected to a phase modulation such as a continuous phase modulation, e.g., by feeding c(k) into a time domain Minimum Shift Keying (MSK) modulator. A minimum shift keying of a Gaussian-formed spectrum may also be denoted as a Gaussian Minimum Shift Keying (GMSK). In a step 116, the modulated signal is transformed to the frequency domain using DFT with M symbols (M-DFT). M-DFT can be described as a complement with respect to the M-IDFT performed in the step 112 as both, DFT and IDFT comprise a number of M symbols and DFT transforms a waveform (time domain) into a spectrum (frequency domain) and IDFT transforms a spectrum into a waveform. Thus, the filtered spectrum is transformed temporarily into the time domain in the step 112, such that with c(k) a temporary signal is obtained.

In a step 118 the output of the M-DFT of step 116 is subjected to a cyclic shift to map the spectrum achieved by performing the step 116 to a desired frequency sub-band of a carrier medium, as it will be described in FIG. 3. By shifting the spectrum to a desired sub-band, the available bandwidth of the medium to be accessed may be utilized to transmit two or more signals in parallel, each in different sub-bands.

In a step 122, the shifted spectrum is subjected to a M-IDFT to obtain a data sequence in the time domain, e.g., an OFDM symbol. In a step 124, a cyclic prefix is added to the obtained data sequence. The cyclic prefix can be added for frequency domain equalization at a receiver side of the transmission. The cyclic prefix can be, for example, a part of the signal output in step 122. Alternatively or in addition, the cyclic prefix may at least partially comprise a part of the data symbol sequence a(n), e.g., a number of last bits of the data symbol sequence a(n). The cyclic prefix may be used, for example, to improve robustness to multipath of the transmitted signal. In a step 126, the signal is transmitted, e.g., via the SC-FDMA channel.

Performing sequentially the M-DFT in the step 116 of the phase modulated temporary time domain sequence, the cyclic shift in the step 118 and the M-IDFT of the shifted signal in the step 122, may be described as an equivalent to an up-conversion, i.e., shifting a signal in the time domain to a desired subcarrier of the channel utilized to transmit the signal. The up-conversion and the steps 116, 118 and 122 being equivalent can be shown by performing a M-DFT of a time domain waveform x(k) according to the determination rule:

$$X_n = \sum_{k=0}^{M-1} x(k) e^{-j2\pi \frac{nk}{M}}.$$

Where $X_n$ denotes a spectrum of a time domain waveform x(k) and M denotes the number of samples of the final waveform.

The cyclic shift (CS) performed in the step 118 may be used to shift the spectrum of the signal from a sub-carrier n to (n+$N_{center}$) mod M in the previous formula, where "mod" denotes the modulo operator, such that the number of N symbols can be mapped to the number of M symbols.

The M-IDFT of step 122 yields:

$$\tilde{x}(k) = \frac{1}{M} \sum_{l=0}^{M-1} \left( \sum_{k=0}^{M-1} x(k) e^{-j2\pi \frac{(n+N_{center})k}{M}} \right) e^{j2\pi \frac{nl}{M}} = x(k) \cdot e^{-j2\pi \frac{k \cdot N_{center}}{M}}.$$

Thus, the steps 116, 118 and 122 may alternatively be expressed together as a step 128, indicating the up-conversion.

Embedding a GMSK-modulation as it may be used, for example, in the Global System for Mobile Communication (GSM)-Standard, into the localized form of SC-FDMA can enable a more or even completely smooth envelope of the waveform, as it is described in [18]. In the GSM system a Gaussian filter is used to reduce out-of-band radiation. In contrast to the approach of combining the CPM with the distributed form of SC-FDMA, as it is described in [9, 10], Method 100 implements a CPM for localized SC-FDMA. Additionally, method 100 may utilize a root-raised cosine filter.

In other words, method 100 reduces the fluctuation of the amplitude of the waveform of localized SC-FDMA transmission. Filtering the repeated spectrum in the step 108 may allow for a first smoothing, e.g., down to a PAPR of around 1.9 dB. Performing a continuous phase modulation in the step 114 in the time domain may allow for a second smoothing down to a PAPR of around 0 dB, wherein a PAPR of 0 dB means that a peak value and an average value of the signal energy are constant. The reduction can be achieved without dismissing the high flexibility of a frequency selective scheduling, as it is implemented in LTE. This can offer an efficient possibility to integrate energy efficient transmission modes seamlessly into the LTE-Standard, which therefore can be better, i.e. more efficiently, applied in the field of wireless sensor networks for the so-called machine-to-machine (M2M)-communication. In addition, method 100 can be applicable for new standards in the fields of optical networks and/or in satellite communications. In satellite communications where, for example, Digital Video Broadcast-Return Channel over Satellite-2 (DVB-RCS2) utilizes a multiple-TDMA protocol or method in the uplink. In TDMA, a "user" is assigned to a (probably static) time slot of the uplink channel. SC-FDMA can enable a higher flexibility with respect to assigning resources dynamically, especially when energy efficiency is increased or even optimized with respect to the PAPR of the transmitted signal. Further applications can be a multiple access to media in low-power scenarios or an integration of wireless sensor nodes into the mobile infrastructure as well as multiple access in optical networks. A further field of application may be acoustic communication.

An optimization of the present SC-FDMA, as it is provided by method 100, can enable an application of SC-FDMA in diverse applications besides the LTE-uplink, such as.

Further possible applications could be found, for example, in the field of passive optical networks (PON) where up to now Time-Division Multiple Access (TDMA) and Wavelength Division Multiplexing (WDM) as well as OFDMA have been utilized and examined in higher research. There, SC-FDMA could also provide a better energy efficiency. Up to now, present methods are not optimized to such an approach. With a more plain waveform, the signal power of the modulated laser might be higher, as a higher degree of modulation could be possible when, the same transmitter and receiver frontends are used. Thus, among other things, the transmit range of the signals can be increased.

Method 100 modifies the SC-FDMA method in a way, such that a better or even optimal energy efficiency is achieved with respect to the PAPR of the transmitted signal. Other advantages of SC-FDMA, e.g. high spectral efficiency, flexible assigning of resources and easy equalization in the frequency range, can be preserved. In an optimal case, a transmitted waveform is formed by method 100 in a way, such that the waveform comprises approximately no power fluctuations which may decrease power efficiency of transceivers. Limited peak output powers of a transmitted signal, e.g., 200 mW such as by hardware means, e.g., a maximum power of an amplifier to be provided, or spectrum license conditions, e.g., a maximum peak or average signal power to be transmitted into a wireless medium, can therefore exploited more efficiently.

When reviewing a classical time domain GMSK single-carrier transmitter, as it is described in [13, 14], the (serial) data symbol sequence a(n) is upsampled, as it is achieved in step 106, yielding the upsampled signal b(k), respectively the time domain representation of the repeated spectrum b(k). After a Gaussian filter in the time domain, the filtered signal c(k) is obtained. The Gaussian filter can be approximated, using a finite impulse response (FIR) with some memory, i.e. k=1, 2, . . . , K>F·N. Next, c(k) is passed into a minimum shift keying (MSK) modulator where it is first accumulated. The resulting phase can be determined by the determination rule:

$$\phi(k) = \phi(k-1) + \frac{\pi}{2F} c(k-1)$$

which can then be inserted into a complex amplitude according to the determination rule:

$x(k)=I+jQ=\cos(\Phi(k))+j\sin(\Phi(k))$.

In-phase signal I and quadrature signal Q are fed by the same phase but at a shift of 90°, caused by cosine, respectively sine operators, yielding a single side band (SSB) modulation when up-converting the sequence to the desired center frequency. This can be performed using an analog IQ modulator.

Method 100 can implement the same using complex-valued signal processing and by transmitting the signal via the SC-FDMA medium. In the combined step 128, the GMSK baseband signal is multiplied sample-by-sample with a digitally synthesized OFDM subcarrier signal. Step 122 is configured to apply a window of length M in the time domain. Thus, method 100 can implement an equivalent signal processing for GMSK in the frequency domain. In the step 104 the data sequence a(n) is fed into the N-DFT.

The forming of the filtered spectrum in step 108 may be performed by applying a filter, e.g., a Gaussian filter, a Blackman window or a Hamming window, in the frequency domain. The filter respectively its parameters may be computed, for example, by defining a vector with a running index s=[−R, . . . , R] where R≤N and by solving $$G_n = e^{-\beta^2 \cdot s_n^2} \text{ where } \beta = \sqrt{\frac{\ln(2)}{2}} \cdot \frac{1}{N \cdot BT}$$

with n=1, 2, . . . , 2R+1, wherein BT denotes a bandwidth-time product. The bandwidth-time product may indicate a gradient of the slope of a filter. A larger bandwidth-time product may lead to an increased bandwidth occupied for the sake of a reduction of out-of-band distortions. A bandwidth-time product may be, for example approximately 0.2, 0.3, 0.4 or another value below 0.5. As GMSK implements a non-linear SSB phase modulation, the phase Φ (k) and the complex amplitude x(k), respectively, the two functions of accumulating and generating in-phase-signal I and quadrature signal Q may possibly be better realized in the time domain due to the non-linearities. Computing I and Q in the time domain may necessitate less computational power and/or provide more exact results. Therefore, the MSK modulation in step 114 is performed in time domain, enabled by transforming the filtered spectrum which is the output of step 108 into the time domain in step 112.

Performing GMSK can lead to adjacent channel interference since SSB phase modulation is a non-linear process and thus can cause distortion in the frequency domain. Even if the GMSK modulator input is confined in the frequency domain, as it may be performed by the forming of the filtered spectrum in step 108, four-wave mixing between in-band sub-carriers can create out-of-band interference. Such interference may be cut by an optional post-modulation filter in the frequency domain, which may totally attenuate outside the range s=[−R, . . . , R], and by correcting the signal power.

Method 100 implements the GMSK modulator after frequency domain filtering, but in the time domain, which enables a reduced interference. Before the signal c(k) is fed into the MSK modulator in the step 114, the signal c(k) may be normalized to a unit peak amplitude for enabling a better modulation, i.e., a lower PAPR of the resulting signal.

In the following, a schematic block diagram of a method 1000 is described, depicting partially a transmission of the symbol data sequence a(n) according to the LTE Standard in an LTE transmitter. In a step 1002, which equals the step 102, the data symbol sequence a(n) is provided. In a step 1004, which equals the step 104 the data symbol sequence a(n) is passed through the N-DFT. In a step 1005 which equals the step 105 the number of N subcarriers is mapped to the number of M subcarriers. In a step 1018, which equals the step 118, the spectrum obtained by step 1004 is mapped directly onto the desired frequency sub-band using the cyclic shift (CS). In a step 1022, which equals the step 122, the spectrum is passed through the M-IDFT to obtain the signal which is added by the cyclic prefix in a step 1024, which equals the step 124. The signal containing the cyclic prefix is transmitted in a step 1026 which equals the step 126. Thus, method 100 can also be understood as an enhanced method for a SC-FDMA transmitter in LTE.

Besides scalable bandwidth per user and high system capacity, SC-FDMA can comprise lower PAPR which may enable better energy efficiency, compared to orthogonal frequency division multiple access (OFDMA) systems based on the superposition of multiple subcarriers, as it is described in [5].

The SC-FDMA waveform can be synthesized in the frequency domain. Data are passed through a discrete Fourier transform (DFT), the output is mapped to the desired sub-band in the frequency domain and the signal is fed into an orthogonal frequency division multiplexing (OFDM) transmitter. This can also be denoted as DFT-spread OFDM [6].

In the following, a schematic block diagram of a method 1100 for transmitting a signal as it is suggested in [7, 11] is described. The method 1100 comprises a step 1102 in which the data symbol sequence a(n) is provided and a step 1104 which equal step 104 in which N-DFT is performed. The method 1100 further comprises a step 1106 which can equal the step 106 for repeating the spectrum achieved by step 1104 for F-times in the frequency domain. Method 1100 comprises a step 1108 which equals the step 108 for forming a filtered spectrum out of the repeated spectrum. The method 1000 further comprises a step 1118 which equals the step 118, a step 1122 which equals the step 122, a step 1124 which equals the step 124 for adding the cyclic prefix and a step 1126 which equals the step 126 of method 100 for transmitting the signal.

Thus, method 1100 summarizes a synthesis of filtered quadrature amplitude modulation (QAM) in the frequency domain. In other words, first the data symbol sequence a(n) is passed through the N-DFT (step 1104). In a step 1105 which equals the step 105 the number of N subcarriers is mapped to the number of M subcarriers. The output is repeated in the frequency domain (step 1106). Next, the signal is filtered in the frequency domain (step 1108) and up-converted to the desired center subcarrier $N_{center}$ using the CS (1118). Finally, the signal is passed through the M-IDFT (1122) and the CP is added (1124), as it is described in [7, 11]. In filtered QAM transmission (method 1100) the carrier mapping is modified compared to LTE Release 8 (method 1000). In this way, waveforms may become comparable to time domain processing as it is described in [11].

Using filtered $\pi/2$ BPSK in method 1100, the PAPR of the transmitted may be reduced from approximately 5 dB in LTE Release 8-10 to approximately 1.9 dB. In contrast, method 100 allows for a PAPR of down to 0 dB by implementing a continuous phase modulation in the time domain.

Both, methods 100 and 1100 necessitate an increased bandwidth which may be approximately 20% higher compared to method 1000. In addition, for GMSK, tail bits may be necessitated to ensure a correct demodulation. As it will be described in FIG. 2, demodulating the phase-modulated signal may be performed by determining arctan-operations which can lead to ambiguities, e.g., for an operand like $\pi/2$. By adding tail bits, a correct demodulation of a first bit of the received signal may be enabled, enabling a decoding of subsequent bits.

An advantage of method 100, using GMSK is a further reduced PAPR, such that a low PAPR such as 0 dB may be achieved.

In other words, the envelope of continuous phase modulation (CPM) of the MSK-modulator in step 114 can be flat or even absolutely flat. Gaussian minimum-shift keying (GMSK) represents a CPM scheme in second generation (2G) mobile networks. A CPM scheme is described in [9, 10] using the distributed form of SC-FDMA also known as interleaved frequency division multiple access (IFDMA). However, most sensors may be immobile, i.e. the multi-path channel can be static and frequency-selective scheduling may improve the performance compared to distributing the signal. Moreover, waveforms localized in the frequency domain can be easily handled with reduced sampling rate. For many applications, localized SC-FDMA as in method 100 may be favorable because data symbols are distributed over consecutive subcarriers and not spread over the whole bandwidth as in IFDMA [5].

Method 100 depicts an energy efficient scheme for localized SC-FDMA. The new mode can be implemented as a backwards-compatible extension of the LTE uplink for enhancing the performance of especially, but not limited to, low-power scenarios.

SC-FDMA is related to serial modulation, wherein this relation might be hardly obvious. For intuition, it can be assumed that a DFT and an inverse discrete Fourier transform (IDFT) in the OFDM transmitter have the same size. In this case, DFT, carrier mapping and IDFT are obsolete yielding a serially modulated carrier.

If the DFT is smaller, i.e., comprises less symbols, the signal bandwidth is reduced. Mapping in LTE can then be regarded as a rectangular filter in the frequency domain since the amplitudes of unused subcarriers may be set to zero. The result can be a probably severe distortion in the time domain. Obviously, the envelope may be smoother if better filtering is used. A root-raised cosine (RRC) filter with small roll-off factor is proposed in [7]. Filtering after the OFDM transmitter is studied in [8]. No such filter is used in LTE.

Serial waveforms using quadrature amplitude modulation (QAM) possibly cross the origin (point of intersection of I-axis and Q-axis) between symbol constellations. These crossings contribute to the envelope fluctuation. For LTE, $\pi/2$ binary phase-shift keying (BPSK) was discussed where the phase is rotated by $\pi/2$ from symbol to symbol.

Compared to [9, 10] the MSK-modulation in step 114 is performed after the N-DFT in step 104, the repetition in the frequency domain in step 106, the filtering of the frequency domain in step 108 and the M-IDFT of step 112, which enables a more efficient filtering in the frequency domain.

In other words, FIG. 1 depicts a logic of the single-carrier frequency division multiple access transmitter evolution towards higher energy efficiency. Starting from LTE Release 8 (method 1000), for filtered $\pi/2$-BPSK and QAM, repetition and subsequent root-raised cosine (RRC)-filtering is applied in the frequency domain (method 1100). A probably absolutely flat envelope is reached using GMSK (method 100). The MSK modulator is therefore inserted in the time domain after the Gaussian filter (performing step 108). Modulation (step 114) performs accumulation and non-linear phase modulation having no straightforward equivalent in the frequency domain. Finally, a cyclic shift (step 118) to the desired resource block is applied, the signal is fed into the IDFT (step 122) and a cyclic prefix CP (step 124) is added. By method 100, an energy-efficient modulation and frequency domain filtering is integrated into the localized form of single-carrier frequency-division multiple access, which is widely used in the LTE mobile communications standard.

Both schemes, method 100 and 1100 have significantly reduced envelope fluctuations and allow higher energy efficiency accordingly. Using GMSK, peak-to-average power ratio can be reduced down to 0 dB. For filtered $\pi/2$-BPSK a PAPR of 1.9 dB can be reached. In both cases, 20% more bandwidth is occupied. For GMSK, a post-modulation filter can be skipped, since the modulation can be very robust. Receiver sensitivity is almost maintained while complexity may be increased insignificantly compared to LTE. The schemes are of interest for several applications where multiple terminals share the spectrum while operating at very low signal-to-noise ratio.

Single-carrier frequency-division multiple access (SC-FDMA) can enable simplified equalization and flexible multiuser scheduling in the frequency domain. Compared to orthogonal frequency division multiple access (OFDMA), it may lead to reduced envelope fluctuations in the same bandwidth. SC-FDMA is widely used in mobile communications, where the focus is on spectral efficiency. Method 100 enables an evolution towards better energy efficiency. In other words, method 100 provides a transmission schemes combining energy-efficient modulation and frequency domain filtering. Using Gaussian minimum-shift keying (GMSK) and filtered $\pi/2$ binary phase-shift keying (BPSK), the peak-to-average power ratio (PAPR) can be reduced down to 0 and 1.9 dB, respectively, while penalties at the receiver side can be negligible.

Energy-efficient multiple access is the goal in many low-power applications. Wireless sensor nodes are supposed to operate on battery power for long times. For connecting them to a mobile network [1], energy-efficient transmission is necessitated. The same holds for multiple access in passive optical networks (PONs) for fiber to the home (FTTH). Multiple user signals are aggregated in a passive fiber coupler and fed jointly to the central office [2]. In the return channel over satellite (RCS), large numbers of users are served in parallel [3]. The received signal is poor due to low-cost transmitters, small dish antennas and large distance to the satellite. By implementing method 100, such poor signals may be transmitted with a better quality my means of a lower PAPR.

The advantage of lower PAPR can be turned into a higher modulation index at the transmitter. Overall, a higher energy efficiency can be realized.

The described transmission modes relate to an extension of a method described in [11] by π/2-BPSK modulation in combination with a root-raised cosine filtering (to FIG. 1). This configuration can enable a low peak-to-average-power ratio (PAPR) of approximately 1.9 dB.

The described method 100 is based on a localized SC-FDMA signal, whereby up to all of the used subcarriers may be pair-wise adjacent comprising advantages, named in [18]. One of the advantages is that the LTE-Standard supports the implementation of method 100. This yields in method 100 being integrable directly into LTE. An integration may be performed, for example, such that an apparatus, e.g., a receiver and/or a transmitter, may be configured to implement method 100. A configuration of an apparatus to implement method 100 may be realized, for example, by programming program steps of the method 100 to a memory of the apparatus, such as a FPGA, a ROM, a PROM, an EPROM, an EEPROM or a FLASH memory. Thus, hardware used for implementing LTE may also be used to implement method 100.

Figure 2A:
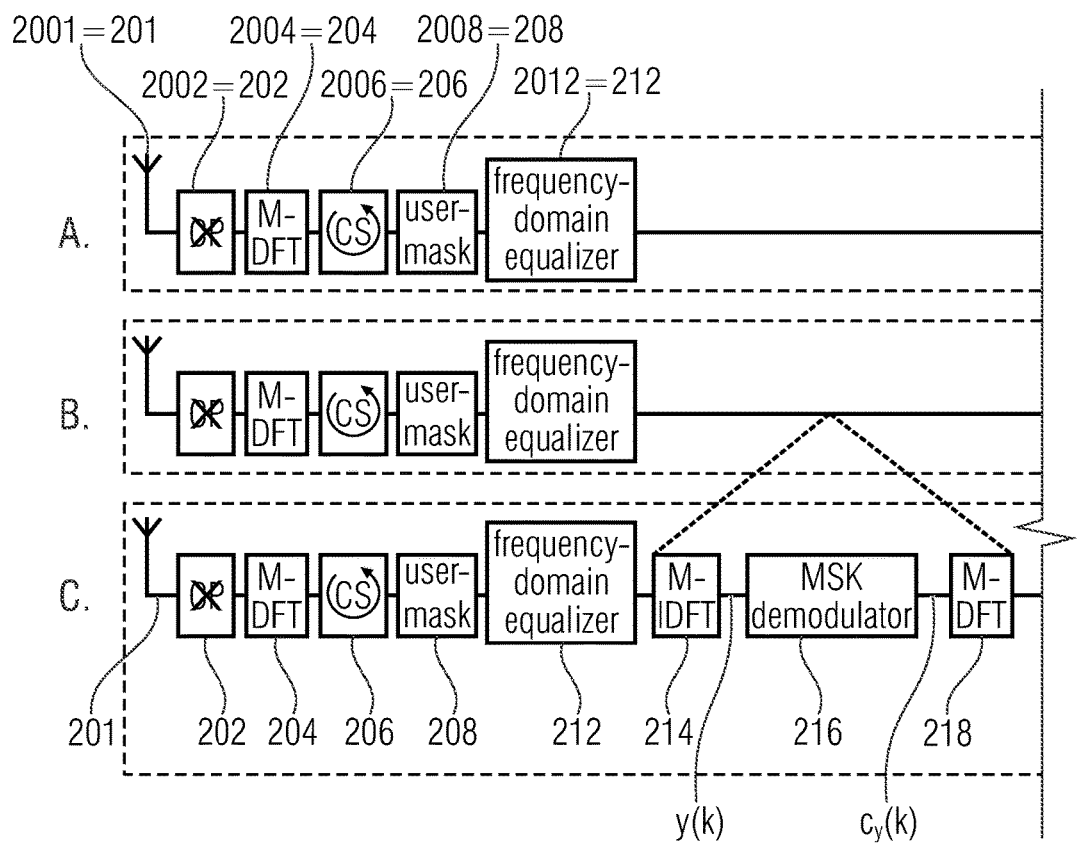
FIGS. 2a and 2b show a schematic diagram of advanced methods for receiving a SC-FDMA signal.
Figure 2B:
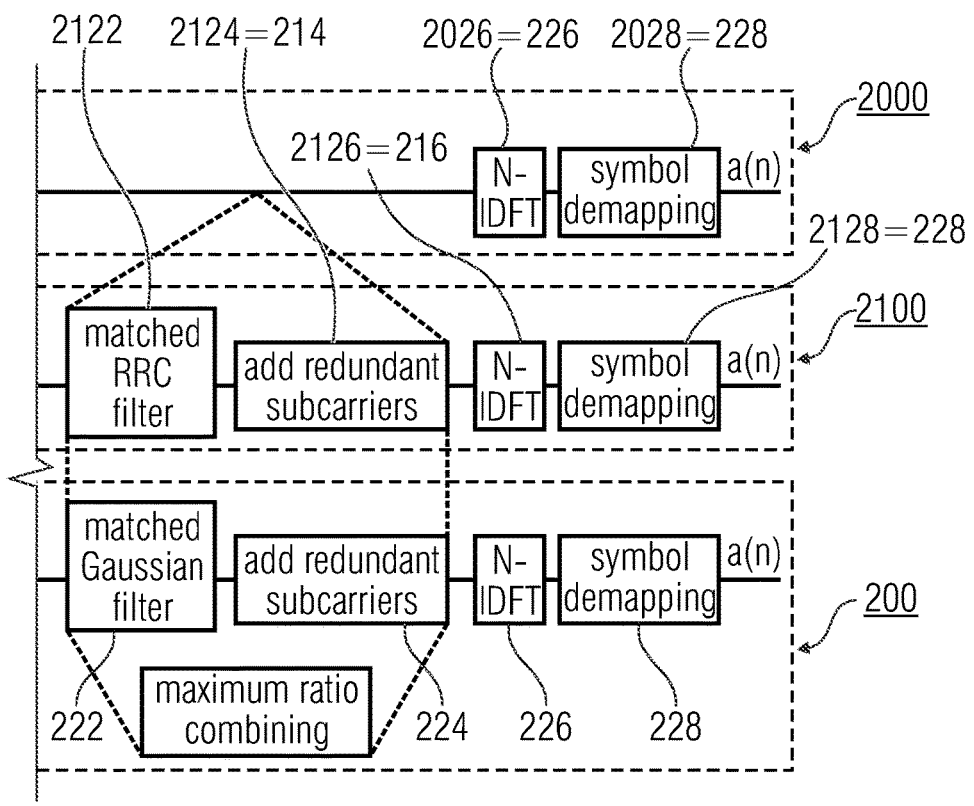

FIG. 2 shows a schematic diagram of an advanced method 200 for receiving a SC-FDMA signal. FIG. 2 also shows a schematic diagram of a method 2000 for receiving a signal according to the LTE Standard Release 8-10 and a schematic diagram of a method 2100 for receiving a signal according to an enhanced method compared to the LTE Standard.

First, method 200 is described in detail. Afterwards, methods 2000 and 2100 are described and compared against method 200.

Method 200 may be applied to receive a signal that was sent by utilizing method 100, for example. In a step 201, a signal, such as a SC-FDMA signal comprising an OFDM symbol is received, e.g., by an antenna of a mobile device such as an LTE cellular phone or a mobile sensor. In a step 202, the cyclic prefix is removed from the received signal. In a step 204, M-DFT is performed as, e.g., for OFDM, to obtain a spectrum, i.e., a frequency domain representation, of the phase-modulated signal. In a step 206, the spectrum of the phase-modulated signal is demapped in terms of a reverse cyclic shift that is used, such that the desired user signal is extracted from an assigned sub-band inside the system bandwidth. In a step 208, a user mask is applied to the spectrum, such that all other than those subcarriers assigned to a particular user are set to zero. As SC-FDMA allows for more than one user or communicating peer such as a sensor node to access the shared medium channel, a dedicated receiver or receiving peer has to select for those signals or data being assigned for the designated peer. As mentioned before, the assignment of resources may be performed dynamically in LTE. By setting all other values to zero, such signals and/or data not assigned for the dedicated receiver is ignored for further processing, such that computational efforts may be reduced.

In a step 212, for each user a frequency domain equalization is performed based on the channel of the communication system estimated for the desired user. In a step 214, M-IDFT is used to transform the equalized spectrum to the time domain. In a step 216, this time domain signal y(k) is decomposed into real and imaginary parts, $I_y(k)$ and $Q_y(k)$, which are used to compute the phase according to the determination rule:

$$\phi_y(k) = \arctan\frac{Q_y(k)}{I_y(k)}.$$

Ambiguities of the arctan-function may cause phase ambiguities, yielding $\phi_y(k)$ involving phase jumps from π/2 to −π/2 or vice versa. An unwrapping algorithm may be used for obtaining a continuous phase. A derivate $c_y(k)$ of the transmitted signal c(k) may be computed according to the determination rule:

$$c_y(k)=\Phi_y(k)-\Phi_y(k-1).$$

By correcting the derivate $c_y(k)$ at k=1 allows to ensure continuity during decoding and to avoid decoding errors caused by the ambiguities of the arctan-function, as subsequent phase values depend each on the respective preceding phase. In a step 218, the derivate $c_y(k)$ is fed into the M-DFT and thus transformed into the frequency domain. As step 214 is used for transforming the equalized spectrum to the time domain to obtain a signal out of the spectrum, which is then demodulated in step 216 and afterwards transferred back to the frequency domain, the time domain signal generated in step 214 may be denoted as a temporary phase-modulated (after the step 214) or temporary demodulated (after the step 216) signal as it is transformed temporarily into the time-domain for performing demodulation. In a step 222, a matched filter, e.g., a Gaussian filter, is applied to the spectrum generated in step 218. The matched filter may be at least a part of an inverse operation to the carrier mapping of method 100. In case N is smaller than M, in a step 224 some or all of the redundant subcarrier signals in the frequency domain, contributing to the same N-IDFT input signal, are added to the spectrum formed in step 222 to enable a correct reconstruction of the initially transmitted data symbol sequence a(n). This may be achieved by performing an N-IDFT in a step 226 and a symbol demapping in a step 228. The step 222 and 224 can be denoted together as a maximum ratio combining in which subcarrier signals containing redundant information can be summed up to reduce a bit error rate of the transmitting signal.

An implementation of method 200, e.g., in MATLAB, may reveal frequent errors at a beginning and an end of the demodulated waveform. The errors may be related to the user mask applied in step 208. The user mask can be considered as a rectangular filter in the frequency domain causing transient effects and thus errors in the time domain. As all undesired values are simply set to zero, this can be regarded as a transient function with high or even infinite gradient edges of the function. Such effects may also be observed in 2G mobile networks. They can be omitted by introducing (additional) tail bits for the first and the last bit in the sequence a(n), which are not part of the data to be transmitted. A distortion of these tail bits during reception or decoding may leave information of the data symbol sequence a(n) less disturbed or unaffected.

By performing method 200, a data symbol sequence a(n) encoded and/or modulated, e.g., by method 100, and transmitted via SC-FDMA may be received, reconstructed and processed by a receiver.

At the receiver, sharing the overall system bandwidth by multiple users can be simplified using maximum ratio combining of redundant information in the frequency domain and subsequent N-IDFT. In this way, performance can be within 0.2 dB compared to the direct mapping applied in LTE.

Method 200 is adapted to perform a reception of a signal obtained and transmitted according to method 100. As method 100, method 200 may be integrated into the LTE standard such that hardware components may be configured or programmed to implement method 200 in addition or alternatively to method 100.

Method 2000 shows a method for receiving a signal as it is used it in the LTE-Standard. After receiving a signal in a step 2201, which equals the step 201, a removing of the cyclic prefix in a step 2002, which equals the step 202, performing M-DFT in a step 2004, which equals the step 204, performing an inverse cyclic shift in a step 2006, which equals the step 206, applying the user mask in a step 2008, which equals the step 208, and performing frequency domain equalization in a step 2012, which equals the step 212, in LTE, the signal is now directly plugged into an N-IDFT in a step 2026, which equals the step 226. In a step 2028, which equals the step 228 the signal is demapped to obtain the data symbol sequence a(n). Method 2000 is adapted to reconstruct a data symbol sequence a(n) which is transmitted by the method 1000. In other words, for GMSK reception in method 200, a MSK demodulator may be inserted in the time domain. After frequency domain equalization, the signals on subcarriers n=1, 2, . . . , R+1, and n=M−R are used, while the signal is zero as well.

As a complement to method 1100, method 2100 allows for a reconstruction of the data symbol sequence a(n), e.g., transmitted by method 1100. Compared to method 2000, the received signal is spread over more than N subcarriers. Method 2100 can also be denoted as a filtered π/2-BPSK or QAM method for a filtered π/2-BPSK-receiver or a filtered QAM-receiver. First, the output signal of the N-DFT performed at the transmitter of the signal, which may, for example, be obtained by performing step 104 of method 100, is reconstructed according to the steps 2001, 2002 and 2004 at the corresponding transmitter. The first processing steps of method 2100 can be regarded as identically to the first processing steps of method 2000 up to frequency domain equalization in step 2012.

After the frequency domain equalization in a step 2122, a matched filter is applied or inserted. The matched filter, applied to the equalized spectrum in step 2122 can be, for example, a matched root-raised cosine filter. In a step 2124, which equals the step 214, redundant subcarrier signals are added. Both operations, step 2122 and step 2124 can be regarded as maximum ratio combining, as it will be described in FIG. 4. In a step 2126, which equals the step 226 the result of the maximum ratio combining, respectively of the step 2124, is fed into the N-IDFT, as it is described in [11]. In a step 2128, which equals the step 228, a symbol demapping is performed to obtain the data symbol sequence a(n).

Using the reverse operations of method 100, 1000 and/or 1100 in methods 200, 2000 and 2100 a corresponding receiver to transmitters configured to implement the methods 100, 1000, and 1100 may be obtained. In other words, FIG. 2 depicts an evolution of the SC-FDMA receivers starting from LTE (method 2000). For filtered QAM (e.g. method 2100), a maximum ratio combining unit, respective step, composed of a matched filter and the summation over all subcarriers carrying redundant information in the frequency domain is inserted. For GMSK (method 200) the MSK demodulator is realized in the time domain. Therefore, additional M-IDFT and M-DFT steps are inserted, placing the demodulation step 216 between them.

Figure 3:
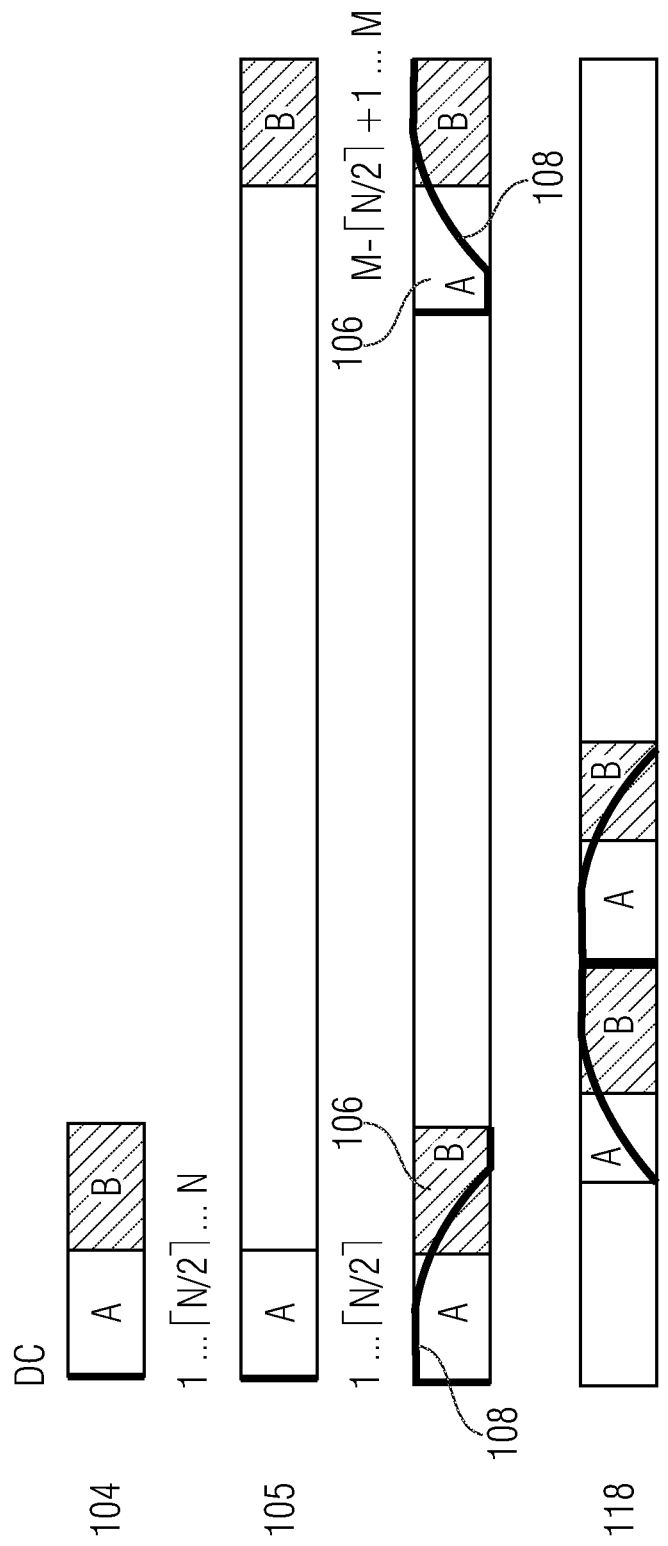
FIG. 3 shows an exemplary schematic diagram of the signal filtering in the frequency domain and the specific carrier mapping for the cyclic shift used in the method for transmitting the signal.

FIG. 3 shows an exemplary schematic diagram of the filtered signal generation, e.g., filtered QAM, in the frequency domain including the cyclic shift (steps 118, 1018 and 1118) which is used in methods 100, 1000, 1100 for a specific carrier mapping according to SC-FDMA.

The direct current (DC) subcarrier of the N-DFT output vector (having index 1) is first mapped onto the DC of the M-IDFT. The two blocks $$A = \left[2 \ \ldots \ \left\lceil \frac{N}{2} \right\rceil \right] \text{ and } B = \left[\left\lceil \frac{N}{2} \right\rceil + 1 \ \ldots \ N \right]$$

are then mapped onto the first and last subcarriers (step 105 of method 100). Periodic replica in the frequency domain (step 106 of method 100) are added next as described in FIG. 1 to emulate the upsampling in the frequency domain and the frequency domain filter is applied (step 108). Finally, the signal is modulated onto the center subcarrier (step 118). In other words, FIG. 3 depicts the modified carrier mapping for method 100, which may also be used for filtered QAM receivers. The step 104 shows the output of the N-DFT, the step 105 shows the subcarrier mapping, the step 106 shows the mapping of N signals onto M subcarriers, the step 108 shows the spectral repetition and multiplication with the filter spectrum, and the step 118 shows the cyclic shift onto the desired sub-band.

FIG. 4 shows a detailed view of the maximum ratio combining performed in method 200. The maximum ratio combining may be an inverse operation to the signal generation (step 105, 106 and 108) shown in FIG. 3. By performing the inverse cyclic shift in step 206, the spectrum of the received signal obtained by the M-DFT in step 204 is demapped from the (assigned) sub-band, which is, for example assigned by method 100, inside the system bandwidth. As explained above, all other subcarriers can be set to zero in the user mask. By performing maximum ratio combining with the steps 222 and 224, the spectrum of the signal as it may be obtained, for example, by step 104 may be reconstructed. The spectrum resulting from the maximum ratio combining can be subjected to the N-IDFT in the step 226.

FIGS. 5a-5d show a comparison of waveforms obtained by different modulation methods. Each FIG. 5a-d shows a real value of a complex-valued waveform on the left side of the figure, and corresponding traces in the complex plane on the right side of each figure.

Figures 5A, 5B:
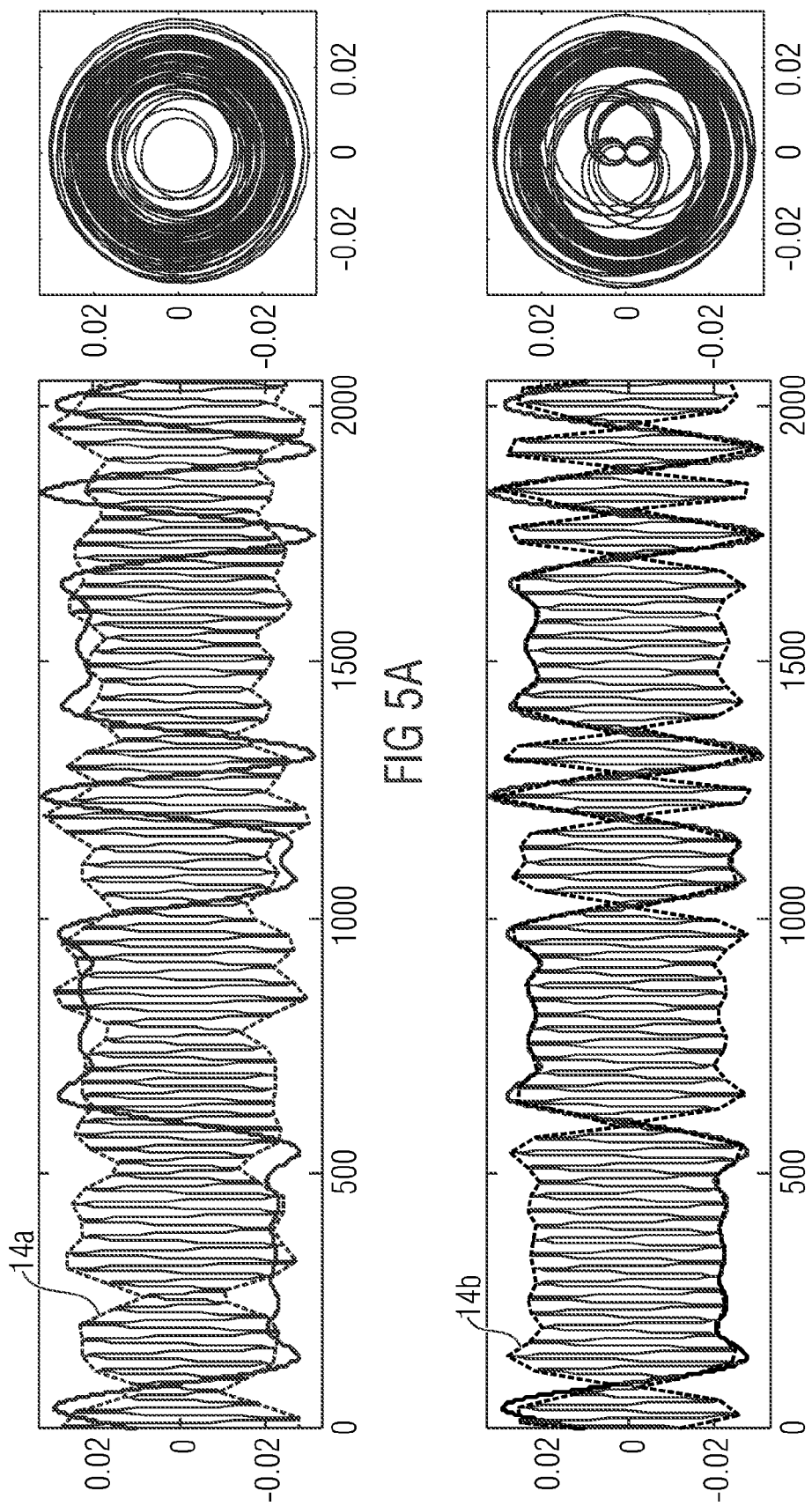
FIG. 5a shows the real value of a complex valued waveform having an envelope and corresponding traces of localized SC-FDMA with $\pi/2$-BPSK modulation.
FIG. 5b shows a real value of a complex valued waveform having an envelope and a corresponding trace of a signal modulated using RRC-filtered BPSK with a roll-off factor of 0.7.

FIG. 5a shows a real value of a waveform having an envelope 14a and corresponding traces of localized SC-FDMA with π/2-BPSK modulation, which is a power-efficient waveform. This waveform was discussed earlier, but not yet adopted in the LTE Standard.

FIG. 5b shows a real value of a waveform having an envelope 14b and a corresponding trace of a signal modulated using RRC-filtered BPSK with a roll-off factor of 0.7, which is considerably larger than described in [7]. In detail, FIG. 5b shows a RRC filtered localized SC-FDMA using BPSK modulation. The filtered data sequence is identical with the envelope 14b, as described in [11]. This means that, most of the time, amplitude is within a small range, and thus low fluctuations but there are zero crossings during constellation changes between the symbols. Therefore, the envelope 14b of the signal is not constant and certain fluctuations remain.

FIG. 5c shows a real value of a waveform having an envelope 14c and a corresponding trace of a signal modulated using RRC filtered SC-FDMA using $\pi/2$-BPSK modulation and a roll-off factor $\alpha=0.7$, which further reduces envelope fluctuations of the envelope 14c compared to the envelope 14b.

FIG. 5d shows a real value of a GMSK-modulated localized SC-FDMA waveform using bandwidth-time product of 0.3 like in 2G mobile networks. Introducing GMSK, an almost constant envelope 14d of the waveform can be obtained. This can be achieved by integrating GMSK (seamlessly) into the localized SC-FDMA framework, as it may be obtained by performing method 100.

The traces of FIGS. 5a-5d show a reduced number of traces in the center (zero) of the corresponding trace diagram from FIG. 5a to FIG. 5d.

FIG. 6 shows a comparison of the peak-to-average power ratio (PAPR) statistics for several waveforms. Graph 1 corresponds to SC-FDMA using $\pi/2$-BPSK (shown in FIG. 5a). Graph 2 corresponds to RRC-SC-FDMA using BPSK (shown in FIG. 5b). Graph 3 corresponds to RRC-SC-FDMA using $\pi/2$-BPSK (shown in FIG. 5c). Graph 4 corresponds to SC-FDMA using GMSK (shown in FIG. 5d). Graph 5 corresponds to SC-FDMA using BPSK. Graph 6 corresponds to OFDMA using BPSK. The PAPR is depicted for localized SC-FDMA in two consecutive resource blocks. The abscissa denotes the PAPR in dB and the ordinate denotes a probability of the PAPR being smaller than the PAPR on the corresponding abscissa.

The graphs 1, 2, 3 and 4 correspond to the waveforms of FIGS. 5a, 5b, 5c and 5d. Graph 5 shows results for SC-FDMA with BPSK and graph 6 shows results for OFDMA with BPSK. Graph 4 (corresponding to FIG. 5d and depicting results for method 100) may comprise a PAPR of down to approximately 0 dB, which means the transmitted signal having a constant amplitude. This can be seen by reference to the flatness of the envelope 14d in FIG. 5d. In addition, with reduced traces being located within the drawn traces of FIGS. 5a-5d, PAPR is reduced accordingly.

Compared to OFDMA (graph 6), the 99-percentile of the cumulative PAPR statistics for $\pi/2$-BPSK in SC-FDMA (graph 1) is still around 5 dB, although the envelope fluctuation is reduced. This can be seen when comparing graph 1 to graph 5, wherein graph 5 depicts results for LTE Standard Release 8-10. Substantial back-off may still be needed to avoid non-linear distortion. SC-FDMA with $\pi/2$-BPSK allows a reduction compared to graphs 5 and 6. Due to the zero crossings of the waveform, for filtered BPSK which can be seen in FIG. 5b, the envelope is not constant and certain fluctuations remain. All together, the 99-percentile of the cumulative PAPR statistics is around 3.5 dB in this way (graph 2). Filtered $\pi/2$-BPSK, e.g., filtered with RRC-filter, can reduce these envelope fluctuations further, as it is depicted in FIG. 5c and graph 3, resulting in a PAPR of 1.9 dB. Performing GMSK, as depicted in FIG. 5d and graph 4 in FIG. 6 can result in an almost constant amplitude, where the PAPR is approximately 0 dB.

FIG. 7 shows a table with exemplary quantities of peak-to-average power ratio of SC-FDMA. The lines show results for different modulation types which may be used to modulate data symbol sequences. The rows denote results for OFDMA, SC-FDMA as it is used in LTE and filtered SC-FDMA. It can be seen that SC-FDMA shows improvements of the PAPR compared to OFDMA, wherein the improvements can be further increased by implementing a filtered SC-FDMA. When applying GMSK to filtered SC-FDMA, as it is described in FIG. 1 for method 100, a PAPR of 0 dB may be achieved.

As described before, for filtered SC-FDMA a higher roll-off factor a may lead to a reduced bandwidth efficiency. FIG. 7 denotes results for a roll-off factor at $\alpha=0.7$. Cutting parts of the bandwidth can be harmless at low signal to noise ratio (SNR), since simple modulation schemes are robust against the resulting distortions. Therefore, also a rectangular post-modulation filter could be used in the frequency domain, as it is described in [11]. Both PAPR and bit error rate tend to be increased if bandwidth is reduced below 1.2×N. Wth 20% more bandwidth, as it is described before, which may be caused by the higher roll-off factor $\alpha$, the PAPR is reduced by 4.4 dB with filtered BPSK compared to BPSK (see line BPSK and the 99-percentile values for SC-FDMA and filtered SC-FDMA).

For GMSK, the Gaussian pre-modulation filter ensures that out-of-band radiation is small compared to rectangular filters and potentially harmless to other users respectively to other subcarriers. Interference can be 25 dB below a desired signal outside the used bandwidth of 1.2×N. Users with higher-order QAM may be interfered by out-of-band emission created by four-wave mixing in a non-linear phase modulator. In the frequency domain, this can be cut using a rectangular post-modulation filter. Unless other users mapped to adjacent sub-bands use such complex modulation alphabets, e.g., 64-QAM, it may be recommended to bypass the post-modulation filter since the PAPR is possibly increased to 1.6 dB if bandwidth is reduced to 1.2×N at the transmitter.

Figure 8:
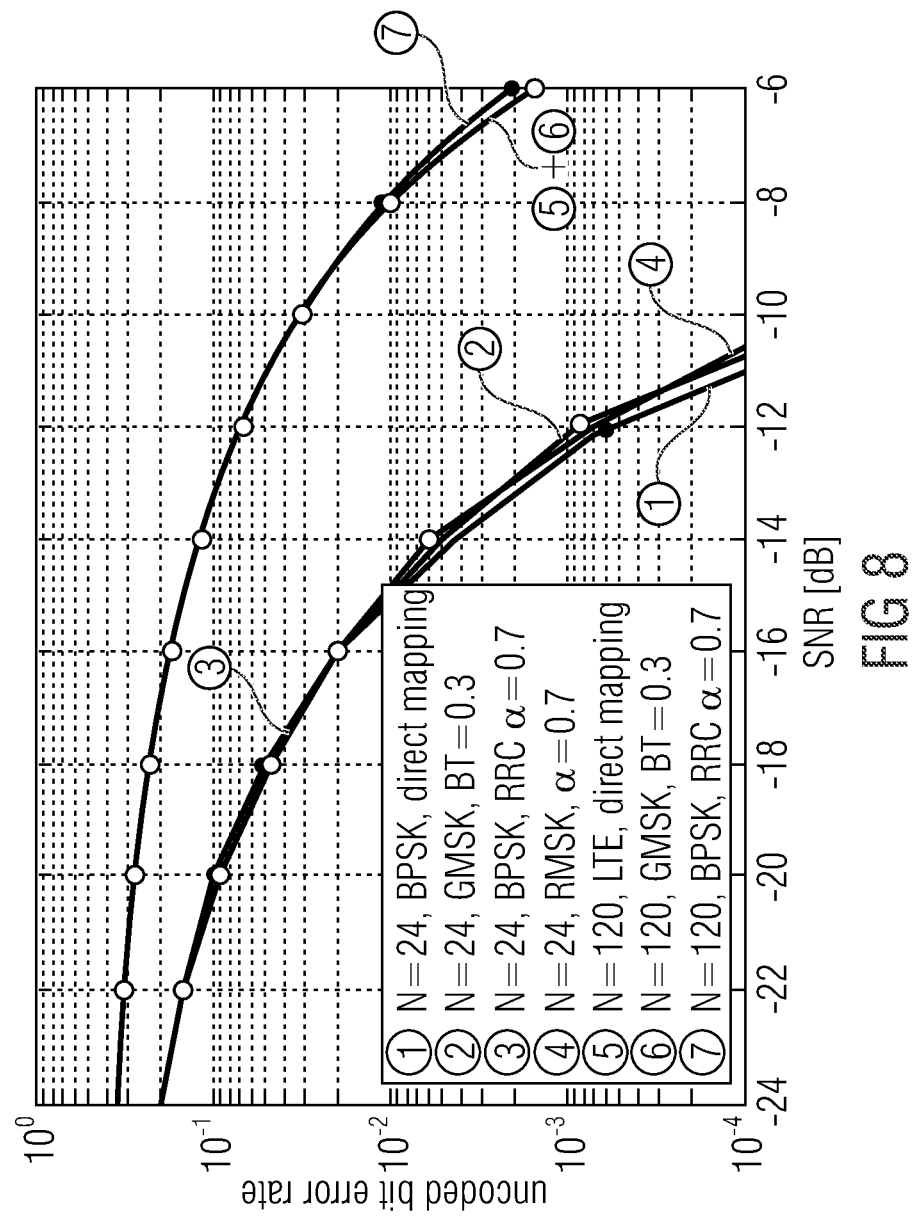
FIG. 8 shows uncoded bit error rates as a possible proof of concept demonstrating that the proposed SC-FDMA waveforms can yield a similar performance at the receiver compared to the LTE Standard.

FIG. 8 shows uncoded bit error rates as a possible proof of concept demonstrating that the proposed SC-FDMA waveforms can yield a similar performance at the receiver compared to the LTE Standard. The simulation, on which FIG. 8 is based, simulated transmission over an additive Gaussian white noise (AWGN) channel. All waveforms are normalized to unit power and distorted by random noise. Respectively corresponding filters were used for simulation at the transmitter and the receiver. Results are shown for N=24 and N=120, while M=2048. RMSK denotes a raised-cosine filtered MSK. Some curves exactly overlap and are thus not visible.

Using N=24, the performance for all schemes is within tenths of a dB, wherein GMSK and filtered BPSK use 20% more bandwidth compared to other waveforms due to a higher roll-off factor a. The correspondingly increased noise is the reason for the small degradation at the receiver. The loss can be more than compensated by increasing the transmit power, which becomes possible due to the reduced PAPR. For example, maximum transmit power may be limited, e.g., in LTE to 200 mW. By reducing the PAPR, the same signal quality with respect to the bit error rate can be transmitted with less power. Vice versa, mean power may be increased up to the limit, e.g. 200 mW, and therefore increased signal quality and decreased bit error rate can be reached, respectively.

At N=24, user signals can be detected with low bit error rates even if the SNR is as low as −15 dB. Weak signals can be detectable, since the power spectral density may be increased if the bandwidth is reduced. Signals from individual low-power terminals can thus be received in parallel to standard terminals provided that, for example, only small amounts of data are transmitted in a small fraction of the overall system bandwidth. Using GMSK and filtered π/2-BPSK, small power transmitters can increase their energy efficiency in addition. At N=120, all curves in FIG. 8 are shifted by $10 \times \log_{10}(5)=7$ dB to a higher SNR since five times more bandwidth is assigned. This is due to the increased noise which is an assumption within the simulation. The necessitated SNR thus may scale linearly with the assigned bandwidth.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. The corresponding apparatus may be configured to implement a method according to the independent claims. The corresponding apparatus may also be configured to implement one of the dependent claims or a combination thereof.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] S.-Y. Lien, K.-C. Chen, and Y. Lin, "Toward Ubiquitous Massive Accesses in 3GPP Machine-to-Machine Communications," IEEE Communications Magazine, vol. 49, no. 4, pp. 66-74, April 2011.

[2] G. Kramer and G. Pesavento, "Ethernet Passive Optical Network (EPON): Building a Next-Generation Optical Access Network," IEEE Communications Magazine, vol. 40, no. 2, pp. 66-73, February 2002.

[3] EN 301 545-2 V I. 1.1, "Digital Video Broadcasting (DVB); Second Generation DVB Interactive Satellite System (DVB-RCS2); Part 2:Lower Layers for Satellite Standard", ETSI Std., January 2012.

[4] 3GPP TS 36.211 v8.9.0, "Evolved Universal Terrestrial Radio Access (E-UTRA); Physical Channels and Modulation (Release 8)," Tech. Rep., December 2009.

[5] H. G. Myung, J. Lim, and D. J. Goodman, "Single Carrier FDMA for Uplink Wireless Transmission," IEEE Vehicular Technology Magazine, vol. 1, no. 3, pp. 30-38, September 2006.

[6] K. Brueninghaus and H. Rohling, "Multi-Carrier Spread Spectrum and its Relationship to Single-Carrier Transmission," in Proc. IEEE Vehicular Technology Conf., VTC'98, vol. 3, May 1998, pp. 2329-2332.

[7] NTTDoCoMo, NEC, and SHARP, "R1-050702: DFT-Spread OFDM with Pulse Shaping Filter in Frequency Domain in Evolved UTRA Uplink," 3GPP TSG RAN WG1 42, London, UK, 2005.

[8] H. G. Myung, J. Lim, and D. J. Goodman, "Peak-To-Average Power Ratio of Single Carrier FDMA Signals with Pulse Shaping," in Proc. IEEE International Symposium on Personal Indoor and Mobile Radio Communications, PIMRC '06, September 2006.

[9] M. P. Green, "Continuous Phase Modulation Encoder for Wireless Networks," U.S. Patent US 2009/0147669 A1, 2009.

[10] M. Wylie-Green, E. Perrins, and T. Svensson, "Introduction to CPMSC-FDMA: A Novel Multiple-Access Power-Efficient Transmission Scheme," IEEE Transactions on Communications, vol. 59, no. 7, pp. 1904-1915, July 2011.

[11] V. Jungnickel, T. Hindelang, T. Haustein, and W. Zirwas, "SC-FDMA Waveform Design, Performance, Power Dynamics and Evolution to MIMO," in Proc. IEEE International Conference on Portable Information Devices (PORTABLE), May 2007.
[12] K. Gentile, "The Care and Feeding of Digital, Pulse-Shaping Filters," available: www.rfdesign.com, April 2002.
[13] K. Murota and K. Hirade, "GMSK Modulation for Digital Mobile Radio Telephony," IEEE Transactions on Communications, vol. 29, no. 7, pp. 1044-1050, July 1981.
[14] T. Turletti, "GMSK in a Nutshell," 1996, http://citeseerx.ist.psu.edu/viewdoc/summary?doi=10.1.1.39.9127.
[15] R. Sawai and H. Harada. Simulation Program to Realize GMSK Transmission System. [Online]. Available: http://www.codeforge.com/read/142158/gmsk.m
[16] M. Wu and Z. Qiu, "Power De-rating Reduction for DFT-S-OFDM System", in Proc. IET International Conference on Wireless, Mobile and Multimedia Networks, 2006
[17] T. Kawamura, Y. Kishiyama, K. Higuchi and M. Sawahashi, "Investigations on Optimum Roll-off Factor for DFT-Spread OFDM Based SCFDMA Radio Access in Evolved UTRA Uplink", In Proc. Int. Symp. Wireless Comm. Systems (ISWCS), 2006, pp. 383-387
[18] Volker Jungnickel and Liane Grobe, "Localized SC-FDMA with Constant Envelope", In Proc. IEEE Int. Symp. On Personal, Indoor and Mobile Radio Comm. (PIMRC), 2013, London
[19] Andreas Forck, Holger Gaebler, Thomas Haustein, Thomas Hindelang, Volker Jungnickel, Wolfgang Zirwas, "Method and/or OFDM device for SC-FDMA data transmission" US Patent US 2010/098182

The invention claimed is:

1. A method for transmitting a signal, the method comprising:
    transforming a signal into a frequency domain to acquire a spectrum;
    forming a filtered spectrum according to a filter spectrum;
    transforming a frequency domain representation of an Orthogonal Frequency Division Multiplex (OFDM) signal, the frequency domain partially occupied with the filtered spectrum into a time domain to acquire a temporary signal; and
    subjecting the temporary signal to a continuous phase modulation.

2. The method according to claim 1, wherein the method comprises a forming of a time domain OFDM symbol out of the phase modulated temporary signal involving a frequency shifting in the OFDM spectrum.

3. The method according to claim 1, wherein the method comprises repeating the spectrum for one or more times to acquire a repeated spectrum, such that the filtered spectrum is formed based on the repeated spectrum.

4. The method according to claim 1, wherein the signal comprises N data symbols and the transforming of the signal into the frequency domain comprises a number of N data points of a Digital Fourier Transformation (DFT).

5. The method according to claim 1, wherein the filter spectrum is a Gaussian spectrum with a bandwidth-time product less than 0.5 or a root-raised cosine spectrum with a rolloff factor of more than 0.5.

6. The method according to claim 1, wherein the OFDM spectrum comprises a number of M blocks to be transformed to the time domain.

7. The method according to claim 1, wherein the phase modulation is adapted to provide an amplitude of the temporary signal according to the determination rule $$\phi(k) = \phi(k-1) + \frac{\pi}{2F} c(k-1)$$

$$x(k) = I + jQ = \cos(\phi(k)) + j\sin(\phi(k))$$

wherein
$\Phi(k)$ or $\Phi(k-1)$ denotes the phase of the temporary signal at a time index k or (k-1);
F denotes a number of times the spectrum of the signal is repeated in the frequency domain before the spectrum is transformed into the time domain;
c(k-1) denotes the temporary signal at the time index (k-1);
x(k) denotes the complex amplitude of the temporary signal;
I denotes the in-phase signal of the temporary signal;
Q denotes the quadrature signal of the temporary signal;
j denotes the complex operator.

8. The method according to claim 1, wherein the method further comprises:
    transforming the temporary signal to the frequency domain to acquire a modulated spectrum;
    shifting the modulated spectrum to a frequency range in a frequency domain representation of an OFDM signal according to a single carrier frequency division multiple access (SC-FDMA) scheme;
    transforming the modulated spectrum to the time domain;
    wherein the transforming of the temporary signal to the frequency domain, the shifting of the modulated spectrum and the transforming of the modulated spectrum can be expressed by the determination rule:

$$exp(-j2\pi k N_{center}/M)$$

subjected to the temporary signal after the phase modulation, wherein
$N_{center}$ denotes a center sub-carrier of the signal to be transmitted.

9. A method for receiving a signal, the method comprising:
    transforming, using DFT, an OFDM signal, the frequency representation thereof partially occupied with a filtered spectrum to a time domain to acquire a phase-modulated temporary signal;
    subjecting the phase-modulated temporary signal to a phase de-modulation to acquire a temporary signal;
    transforming the temporary signal into a frequency domain to acquire a spectrum;
    forming the spectrum according to a matched filter spectrum;
    subjecting the matched filter spectrum to a maximum ratio combining; and
    transforming, using IDFT, the result of the maximum ratio combining;
    wherein the de-modulation comprises a determination of a phase of the temporary signal according to the determination rule:

$$\phi_y(k) = \arctan \frac{Q_y(k)}{I_y(k)}$$

wherein
$\Phi_y(k)$ denotes the phase of the temporary signal at time index k;
$Q_y(k)$ denotes an imaginary part of the temporary signal at time index k; and $I_y(k)$ denotes a real part of the temporary signal at time index k.

10. A method for receiving a signal, the method comprising:

transforming, using DFT, an OFDM signal, the frequency representation thereof partially occupied with a filtered spectrum to a time domain to acquire a phase-modulated temporary signal;

subjecting the phase-modulated temporary signal to a phase de-modulation to acquire a temporary signal;

transforming the temporary signal into a frequency domain to acquire a spectrum;

forming the spectrum according to a matched filter spectrum;

subjecting the matched filter spectrum to a maximum ratio combining; and transforming, using IDFT, the result of the maximum ratio combining;

wherein the temporary signal at a time index k is determined dependent from the temporary signal at a preceding time index (k−1) according to the determination rule:

$$c_y(k)=\phi_y(k)-\phi_y(k-1)$$

wherein $c_y(k)$ denotes a derivative of the signal.

11. The method according to claim 10, wherein the method comprises a correction of the determined derivate cy(k) for a time index k=1.

12. An apparatus for transmitting a signal, the apparatus comprising:

at least one hardware component configured to transform a signal into a frequency domain such that a spectrum is acquired;

form a filtered spectrum according to a filter spectrum;

transform an Orthogonal Frequency Division Multiplex (OFDM) spectrum partially occupied with the filtered spectrum into a time domain such that a temporary signal is acquired; and subject the temporary signal to a continuous phase modulation.

13. A non-transitory storage medium having stored thereon a computer program for performing the method according to claim 1 when said computer program is run by a computer.

14. A non-transitory storage medium having stored thereon a computer program for performing the method according to claim 9 when said computer program is run by a computer.

15. A non-transitory storage medium having stored thereon a computer program for performing the method according to claim 10 when said computer program is run by a computer.

* * * * *